(12) United States Patent
Hamada et al.

(10) Patent No.: US 11,724,904 B2
(45) Date of Patent: Aug. 15, 2023

(54) MEDIUM-TRANSPORTING DEVICE AND IMAGE READING APPARATUS

(71) Applicant: SEIKO EPSON CORPORATION, Tokyo (JP)

(72) Inventors: Yuhei Hamada, Kitakyushu (JP); Tokujiro Okuno, Kitakyushu (JP); Noriyuki Koyanagi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/446,996

(22) Filed: Sep. 7, 2021

(65) Prior Publication Data
US 2022/0073305 A1 Mar. 10, 2022

(30) Foreign Application Priority Data
Sep. 8, 2020 (JP) .................................. 2020-150393

(51) Int. Cl.
*B65H 31/20* (2006.01)
*B65H 31/02* (2006.01)
(Continued)

(52) U.S. Cl.
CPC .............. *B65H 31/20* (2013.01); *B65H 5/062* (2013.01); *B65H 11/02* (2013.01); *B65H 29/14* (2013.01); *B65H 2511/10* (2013.01); *B65H 2701/1131* (2013.01); *H04N 1/0062* (2013.01); *H04N 1/00631* (2013.01)

(58) Field of Classification Search
CPC ........ B65H 31/20; B65H 31/02; B65H 11/02; B65H 29/70; B65H 43/06; B65H 43/08; B65H 43/02; B65H 2511/515; B65H 2511/51; B65H 2405/33125; B65H 2405/324; B65H 2405/11164; B65H 2405/214; H04N 1/0062; H04N 1/00631
See application file for complete search history.

(56) References Cited

U.S. PATENT DOCUMENTS

2009/0226230 A1\* 9/2009 Ohkawa ............. G03G 15/6544
399/408
2018/0352099 A1 12/2018 Hongo et al.
(Continued)

FOREIGN PATENT DOCUMENTS

JP 2002226119 A \* 8/2002
WO 2017/187488 A 11/2017

*Primary Examiner* — Luis A Gonzalez
(74) *Attorney, Agent, or Firm* — Workman Nydegger

(57) ABSTRACT

A medium-transporting device includes: a medium-support section that has a first mounting surface inclined relative to a horizontal plane; a transport path for transporting a medium; a discharge stacker that is configured to switch between an extended state in which a second mounting surface that is inclined relative to the horizontal plane and that receives the medium discharged along the transport path is formed and a stored state in which the second mounting surface is stored in the medium-transporting device, a control section is configured to perform first control of switching the discharge stacker from the extended state to the stored state after the medium is discharged to the second mounting surface and second control of not switching the discharge stacker from the extended state to the stored state such that the medium remains mounted on the second mounting surface.

11 Claims, 17 Drawing Sheets

(51) Int. Cl.
    *B65H 11/02*    (2006.01)
    *B65H 29/14*    (2006.01)
    *B65H 5/06*    (2006.01)
    *H04N 1/00*    (2006.01)

(56) References Cited

U.S. PATENT DOCUMENTS

| | | | |
|---|---|---|---|
| 2020/0045194 A1* | 2/2020 | Tezuka | H04N 1/0057 |
| 2021/0120135 A1* | 4/2021 | Mokuo | H04N 1/00681 |
| 2022/0041387 A1* | 2/2022 | Valenzuela-Rivas | B65H 1/04 |

* cited by examiner

MEDIUM-TRANSPORTING DEVICE AND IMAGE READING APPARATUS

The present application is based on, and claims priority from JP Application Serial Number 2020-150393, filed Sep. 8, 2020, the disclosure of which is hereby incorporated by reference herein in its entirety.

BACKGROUND

1. Technical Field

The present disclosure relates to a medium-transporting device and an image reading apparatus.

2. Related Art

Medium-transporting devices that transport a medium mounted on a mounting surface inclined relative to a horizontal plane while the medium is curved on a medium-transport path and that transport the medium to a discharge stacker formed at a position facing the mounting surface have been used. For example, International Publication No. 2017/187488 discloses an image reading apparatus that transports a document mounted on a mounting surface of a shooter while the document is curved on a transport path and that transports the medium to a mounting surface of a stacker formed at a position facing the mounting surface of the shooter and inclined relative to a horizontal plane.

In the image reading apparatus of International Publication No. 2017/187488, when the stacker is stored in the image reading apparatus, the document, an image of which has been read, is mounted on the mounting surface of the shooter. Here, storing the stacker in the image reading apparatus reduces the apparatus size. However, when the stacker is stored in the image reading apparatus, for example, the document mounted on the mounting surface of the stacker may be jammed in the stacker and be damaged.

SUMMARY

To address the aforementioned problem, a medium-transporting device of the disclosure is a medium-transporting device that transports a medium, and the medium-transporting device includes: a medium-support section that has a first mounting surface which is inclined relative to a horizontal plane and on which the medium is mounted; a transport path for transporting the medium mounted on the first mounting surface, the transport path having a curved path on which the medium is transported in a curved state; a discharge stacker that has a second mounting surface for receiving the medium discharged along the transport path and that is configured to switch between an extended state in which the second mounting surface is inclined relative to the horizontal plane so as to include a position at which the second mounting surface is inclined at an angle identical to an inclination angle of the first mounting surface and a stored state in which the second mounting surface is stored in the medium-transporting device; and a control section that switches the discharge stacker between the extended state and the stored state, in which the control section is configured to perform first control of switching the discharge stacker from the extended state to the stored state after the medium discharged along the transport path is discharged to the second mounting surface and second control of not switching the discharge stacker from the extended state to the stored state such that the medium discharged along the transport path remains mounted on the second mounting surface.

DESCRIPTION OF EXEMPLARY EMBODIMENTS

Figure 1:
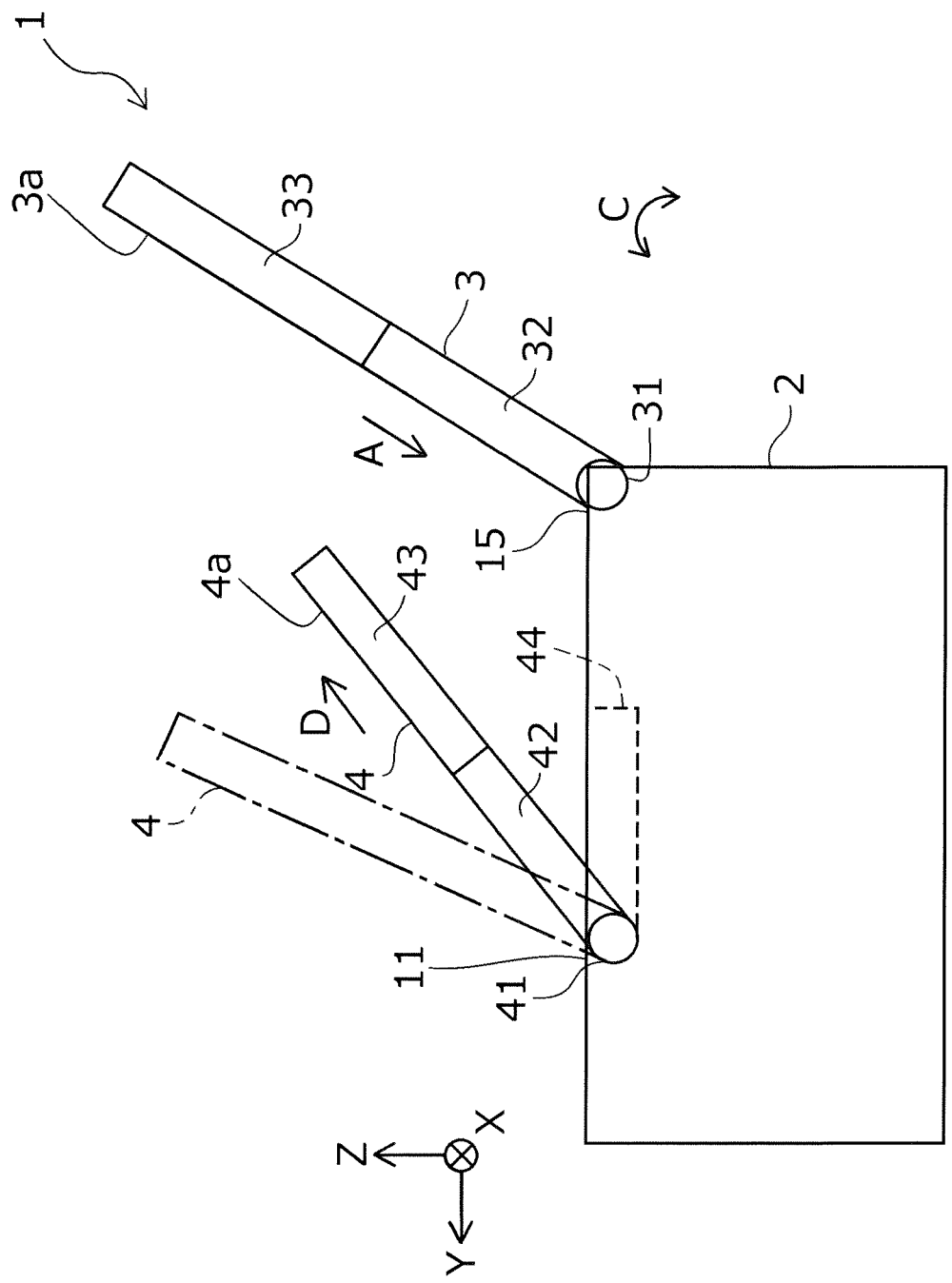
FIG. 1 is a schematic side view illustrating a scanner as an embodiment of the disclosure, in which a discharge stacker and a medium-support section are in an extended state.

The disclosure will be schematically described below.

A medium-transporting device according to a first aspect is a medium-transporting device that transports a medium, and the medium-transporting device includes: a medium-support section that has a first mounting surface which is inclined relative to a horizontal plane and on which the medium is mounted; a transport path for transporting the medium mounted on the first mounting surface, the transport path having a curved path on which the medium is transported in a curved state; a discharge stacker that has a second mounting surface for receiving the medium discharged along the transport path and that is configured to switch between an extended state in which the second mounting surface is inclined relative to the horizontal plane so as to include a position at which the second mounting surface is inclined at an angle identical to an inclination angle of the first mounting surface and a stored state in which the second mounting surface is stored in the medium-transporting device; and a control section that switches the discharge stacker between the extended state and the stored state, in which the control section is configured to perform first control of switching the discharge stacker from the extended state to the stored state after the medium discharged along the transport path is discharged to the second mounting surface and second control of not switching the discharge stacker from the extended state to the stored state such that the medium discharged along the transport path remains mounted on the second mounting surface.

According to the present aspect, it is possible to perform the first control of switching the discharge stacker from the extended state to the stored state and the second control of not switching the discharge stacker from the extended state to the stored state such that the medium discharged along the transport path remains mounted on the second mounting surface. That is, it is possible to perform, in addition to the first control of storing the discharge stacker in the medium-transporting device, the second control of not storing the discharge stacker in the medium-transporting device. Thus, it is possible to inhibit the medium from being damaged upon storing of the discharge stacker that is able to be stored in the device.

In the first aspect, the control section is configured to perform an addition mode in which, after the medium is discharged to the second mounting surface, a new medium is added to the first mounting surface and transported, and the control section performs the second control in the addition mode.

According to the present aspect, due to the presence of the addition mode, each medium is able to be transported while media are added to the first mounting surface one by one. By performing the second control in the addition mode, when a new medium is added, it is possible to inhibit the medium that has been transported along the transport path and discharged to the discharge stacker from reaching the first mounting surface and to inhibit the medium from interfering with adding a new medium.

According to the medium-transporting device of a third aspect, in the second aspect, in the addition mode, after the medium is discharged to the second mounting surface, the control section displaces the discharge stacker such that an inclination angle of the second mounting surface relative to the horizontal plane is larger than an inclination angle of the second mounting surface before the medium is discharged.

According to the present aspect, in the addition mode, after the medium is discharged to the second mounting surface, the discharge stacker is displaced such that the inclination angle of the second mounting surface relative to the horizontal plane increases. Thus, when a new medium is added, a distance between the first mounting surface and the second mounting surface increases, thus making it possible to facilitate adding a new medium.

According to the medium-transporting device of a fourth aspect, in any of the first to third aspects, the control section performs either the first control or the second control in accordance with a dimension of the medium in a transport direction.

When the medium has a long dimension in the transport direction, the medium is readily damaged upon storing of the discharge stacker. However, according to the present aspect, either the first control or the second control is performed in accordance with the dimension of the medium. For example, the second control is performed when the medium has a long dimension, and the first control is performed when the medium has a short dimension, thus making it possible to effectively inhibit the medium from being damaged.

In the fourth aspect, the medium-transporting device of a fifth aspect further includes a dimension detecting section that detects the dimension of the medium in the transport direction, in which when the dimension of the medium in the transport direction detected by the dimension detecting section is equal to or more than a first threshold, the control section performs the second control.

According to the present aspect, when the dimension of the medium in the transport direction is equal to or more than the first threshold, the second control is performed. When a long medium that is readily damaged is used, the second control of not switching the discharge stacker from the extended state to the stored state is performed, thus making it possible to inhibit the medium from being jammed in the discharge stacker and being damaged.

In the fourth aspect, the medium-transporting device of a sixth aspect further includes a dimension detecting section that detects the dimension of the medium in the transport direction, in which when the dimension of the medium in the transport direction detected by the dimension detecting section is equal to or less than a second threshold, the control section performs the first control.

According to the present aspect, when the dimension of the medium in the transport direction is equal to or less than the second threshold, the first control is performed. Thus, when a short medium that is difficult to be damaged is used, it is possible to reduce the device size. In an instance in which a short medium is used, for example, when a new medium is added in the addition mode, it is possible to inhibit the medium that has been transported along the transport path and discharged to the discharge stacker from reaching the first mounting surface and to inhibit the medium from interfering with adding a new medium.

According to the medium-transporting device of a seventh aspect, in any of the first to sixth aspects, a dimension of the discharge stacker in the extended state is configured to be varied, and the control section changes the dimension of the discharge stacker in the extended state in accordance with a dimension of the medium in a transport direction.

According to the present aspect, a distance by which the discharge stacker in the extended state is extended is changed in accordance with the dimension of the medium. Thus, the medium is able to be mounted on the second mounting surface in an appropriate state in accordance with the dimension of the medium.

In any of the first to seventh aspects, the medium-transporting device of an eighth aspect further includes a medium detecting section that detects the medium on the second mounting surface, in which when the medium detecting section detects the presence of the medium on the second mounting surface, the control section performs the second control, and when the medium detecting section detects the absence of the medium on the second mounting surface, the control section performs the first control.

According to the present aspect, the second control is performed when the medium detecting section detects the presence of the medium on the second mounting surface, and the first control is performed when the medium detecting section detects the absence of the medium on the second mounting surface. Thus, it is possible to automatically displace the discharge stacker to an appropriate state.

In any of the first to eighth aspects, the medium-transporting device of a ninth aspect further includes a medium-mounting-amount detecting section that detects the number or weight of media discharged to the second mounting surface, in which when the medium-mounting-amount detecting section detects that an amount of the media mounted on the second mounting surface is not equal to or more than an upper limit value, the control section performs the second control, and when the medium-mounting-amount detecting section detects that the amount of the media mounted on the second mounting surface is equal to or more than the upper limit value, the control section performs the first control.

According to the present aspect, the second control is performed when the medium-mounting-amount detecting section detects that the amount of the media mounted on the second mounting surface is not equal to or more than the upper limit value, and the first control is performed when the medium-mounting-amount detecting section detects that the amount of the media mounted on the second mounting surface is equal to or more than the upper limit value. That is, when the amount of the media mounted on the second mounting surface is equal to or more than the upper limit value, a new medium is not easily mounted on the first mounting surface, thus making it possible to inhibit a new medium from being transported and to inhibit, for example, the discharge stacker from being damaged when the amount of the media mounted on the second mounting surface exceeds endurance limit of the discharge stacker.

According to the medium-transporting device of a tenth aspect, in any of the first to ninth aspects, when the medium-mounting-amount detecting section detects that the amount of the media mounted on the second mounting surface is equal to or more than the upper limit value, the control section outputs an alert.

According to the present aspect, when the amount of the media mounted on the second mounting surface is detected to be equal to or more than the upper limit value, an alert is output. Thus, when the amount of the media mounted on the second mounting surface is equal to or more than the upper limit value, it is possible to inhibit a new medium from being mounted on the first mounting surface and to effectively suppress, for example, a damage to the discharge stacker.

In any of the first to tenth aspects, the medium-transporting device of an eleventh aspect further includes a strengthening member that is provided in a discharge section through which the medium is discharged along the transport path to the discharge stacker and that strengthens the medium when the medium is discharged, in which the strengthening member curves a central portion of the medium to be discharged to the second mounting surface such that the central portion is projected to the second mounting surface as viewed in a discharge direction of the medium.

According to the present aspect, it is possible to strengthen, when the medium is discharged, the medium such that the central portion of the medium to be mounted on the second mounting surface is curved so as to be projected to the second mounting surface as viewed in the discharge direction of the medium. By discharging the medium to the second mounting surface while strengthening the medium, it is possible to suppress a failure in discharging the medium.

An image reading apparatus according to a twelfth aspect includes: the medium-transporting device according to any of the first to eleventh aspects; and a reading section that reads an image of the medium on the transport path.

According to the present aspect, the medium, the image of which has been read, is inhibited from being damaged upon storing of the discharge stacker.

The disclosure will be specifically described below.

As an example of the medium-transporting device and the image reading apparatus, a scanner 1 capable of reading at least one of a front surface and a rear surface of a document M, which is an example of the medium, will be described below. The scanner 1 is a document scanner that reads the document M while moving the document M relatively to a reading section 7.

Note that, in the X-Y-Z coordinate system illustrated in each drawing, the X-axis direction indicates an apparatus width direction and a document width direction. The X-axis direction also indicates a direction extending horizontally. The Y-axis direction indicates an apparatus depth direction and a direction extending horizontally. The Z-axis direction indicates a direction extending vertically. In the present embodiment, the +Y direction is a direction from the rear of the apparatus to the front of the apparatus, and the −Y direction is a direction from the front of the apparatus to the rear of the apparatus. Moreover, when the apparatus is viewed from the front, the +X direction is a direction toward the left, and the −X direction is a direction toward the right. The +Z direction is the vertically up direction, and the −Z direction is the vertically down direction.

Figure 2:
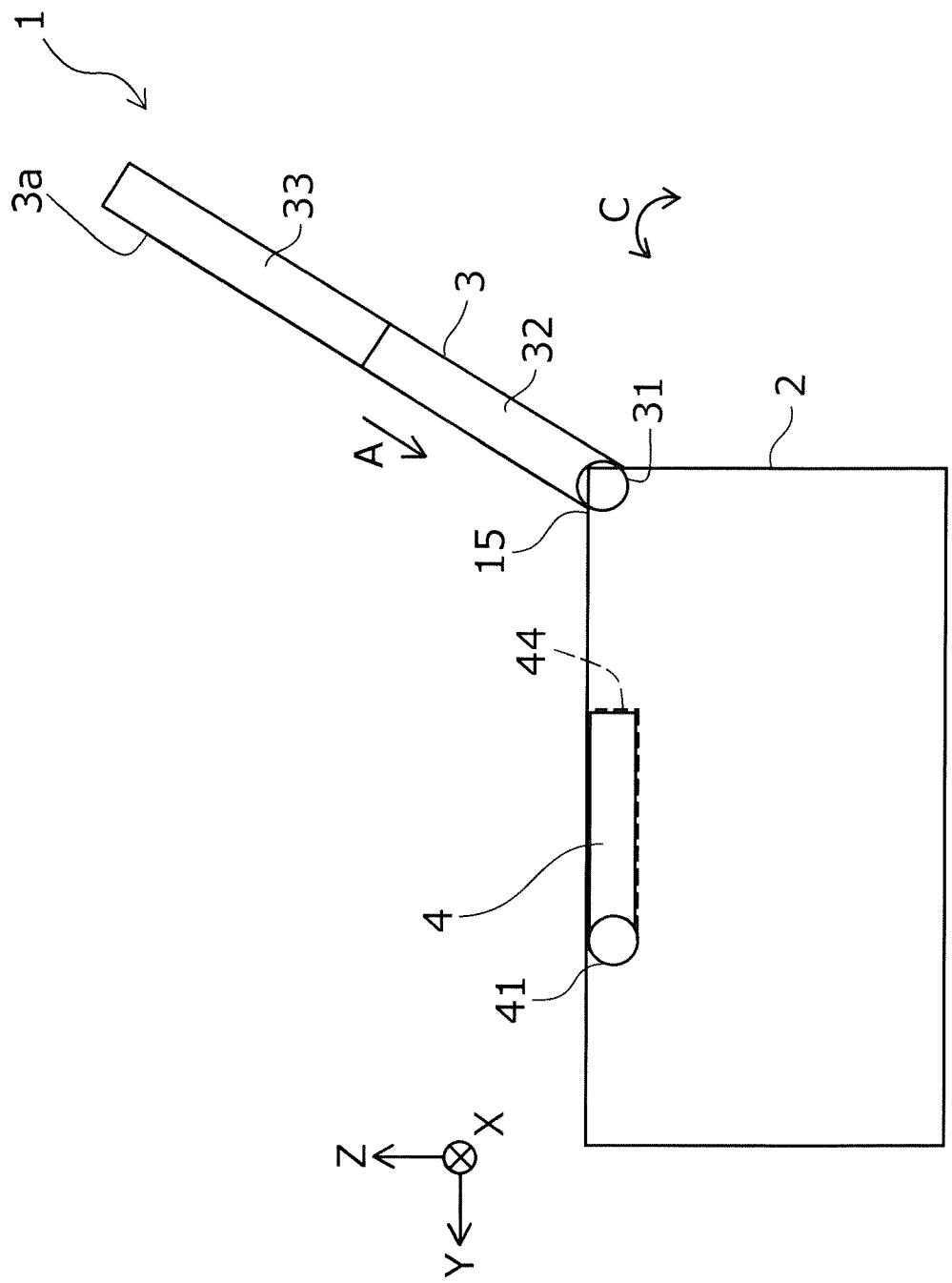
FIG. 2 is a schematic side view illustrating the scanner of FIG. 1, in which the discharge stacker is in a stored state and the medium-support section is in the extended state.
Figure 3:
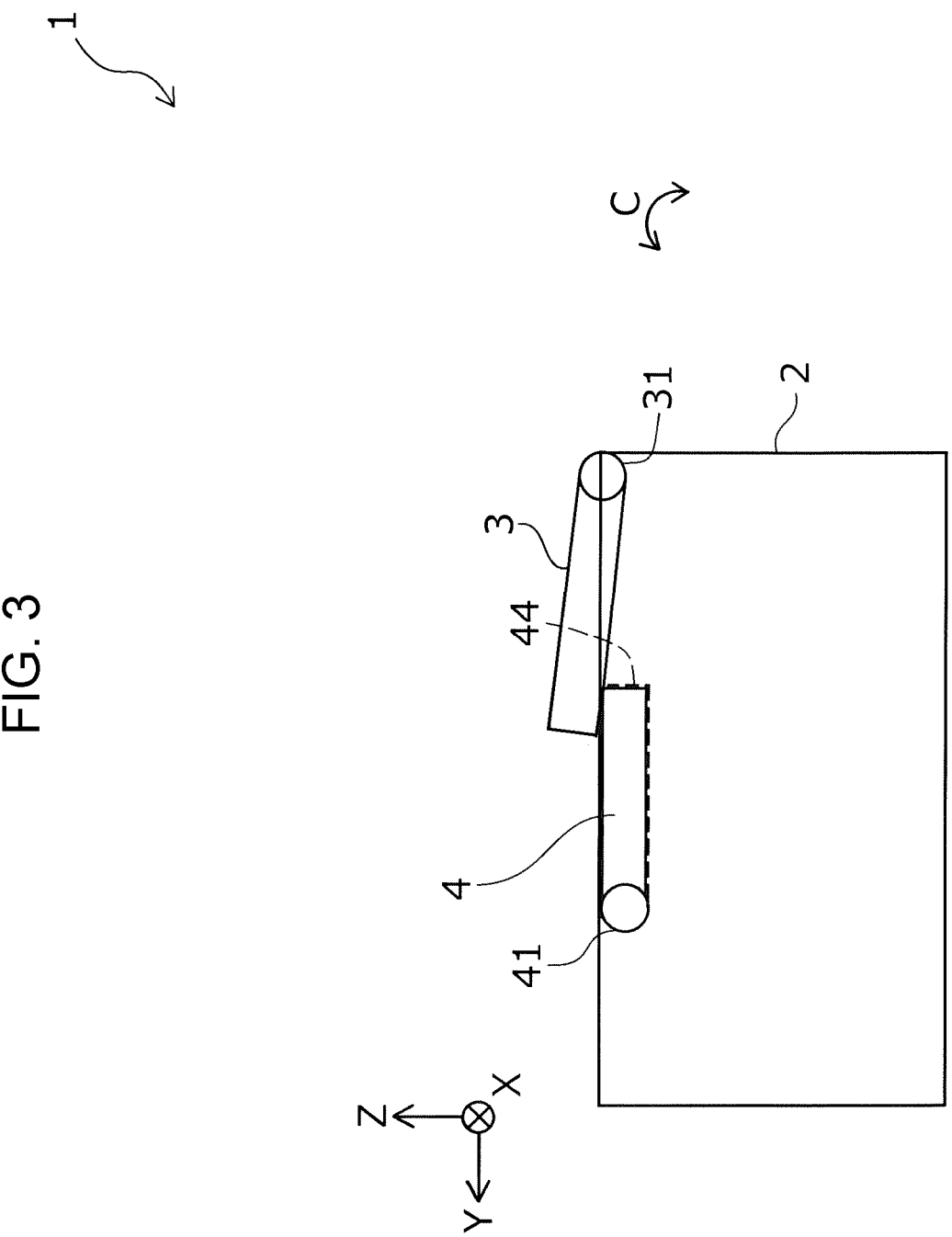
FIG. 3 is a schematic side view illustrating the scanner of FIG. 1, in which the discharge stacker and the medium-support section are in the stored state.

First, an overview of the scanner 1 of the present embodiment will be described with reference to FIGS. 1 to 5. As illustrated in FIGS. 1 to 3 and 5, the scanner 1 includes a housing section 2, a medium-support section 3 arranged across a supply port 15 provided in the housing section 2, and a discharge stacker 4 arranged across a discharge port 11 provided in the housing section 2. The medium-support section 3 includes a rotational shaft 31, a first support section 32, and a second support section 33 and the second support section 33 can be extended from and stored in the first support section 32. The medium-support section 3 is able to rotate about the rotational shaft 31 in a rotational direction C. The medium-support section 3 is able to be displaced between an extended state in which the second support section 33 is extended from the first support section 32 and the medium-support section 3 is located so as to expose the supply port 15 provided in the housing section 2, as illustrated in FIGS. 1 and 2, and a stored state in which the second support section 33 is stored in the first support section 32 and the medium-support section 3 is located so as to cover the supply port 15, as illustrated in FIG. 3.

Here, as illustrated in FIGS. 1 and 2, when the medium-support section 3 is in the extended state, a first mounting surface 3a, which is constituted by surfaces of the first support section 32 and the second support section 33, is inclined relative to the horizontal plane. The document M mounted on the first mounting surface 3a is supplied in a supply direction A via the supply port 15. Note that the medium-support section 3 of the present embodiment is configured such that the second support section 33 can be extended from and stored in the first support section 32, but the configuration is not limited thereto. Moreover, the medium-support section 3 of the present embodiment is configured to include the rotational shaft 31 and to be displaced between the extended state and the stored state, but the configuration is not limited thereto.

Figure 4:
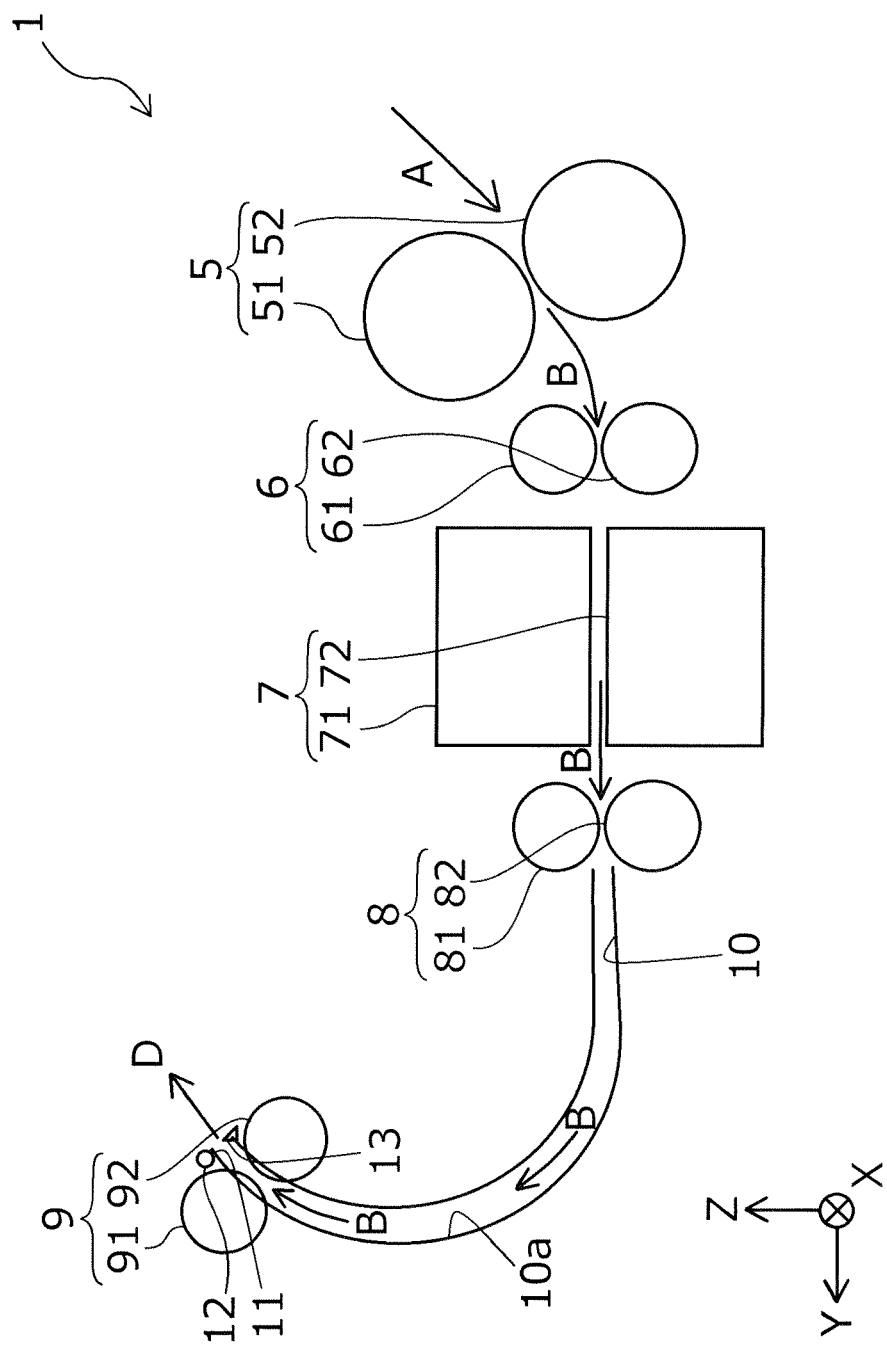
FIG. 4 is a schematic view illustrating an internal configuration of the scanner of FIG. 1.

Here, the interior of the housing section 2 will be described with reference to FIG. 4. The document M mounted on the first mounting surface 3*a* is transported into the housing section 2 by a feed section 5 constituted by a driving roller 51 and a multi-feed prevention roller 52. A roller pair 6, which is constituted by a driving roller 62 and a driven roller 61, and a roller pair 8, which is constituted by a driving roller 82 and a driven roller 81, are provided in the housing section 2. The document M is transported in a transport direction B by the roller pair 6 and the roller pair 8 on a transport path 10 provided in the housing section 2.

Figure 5:
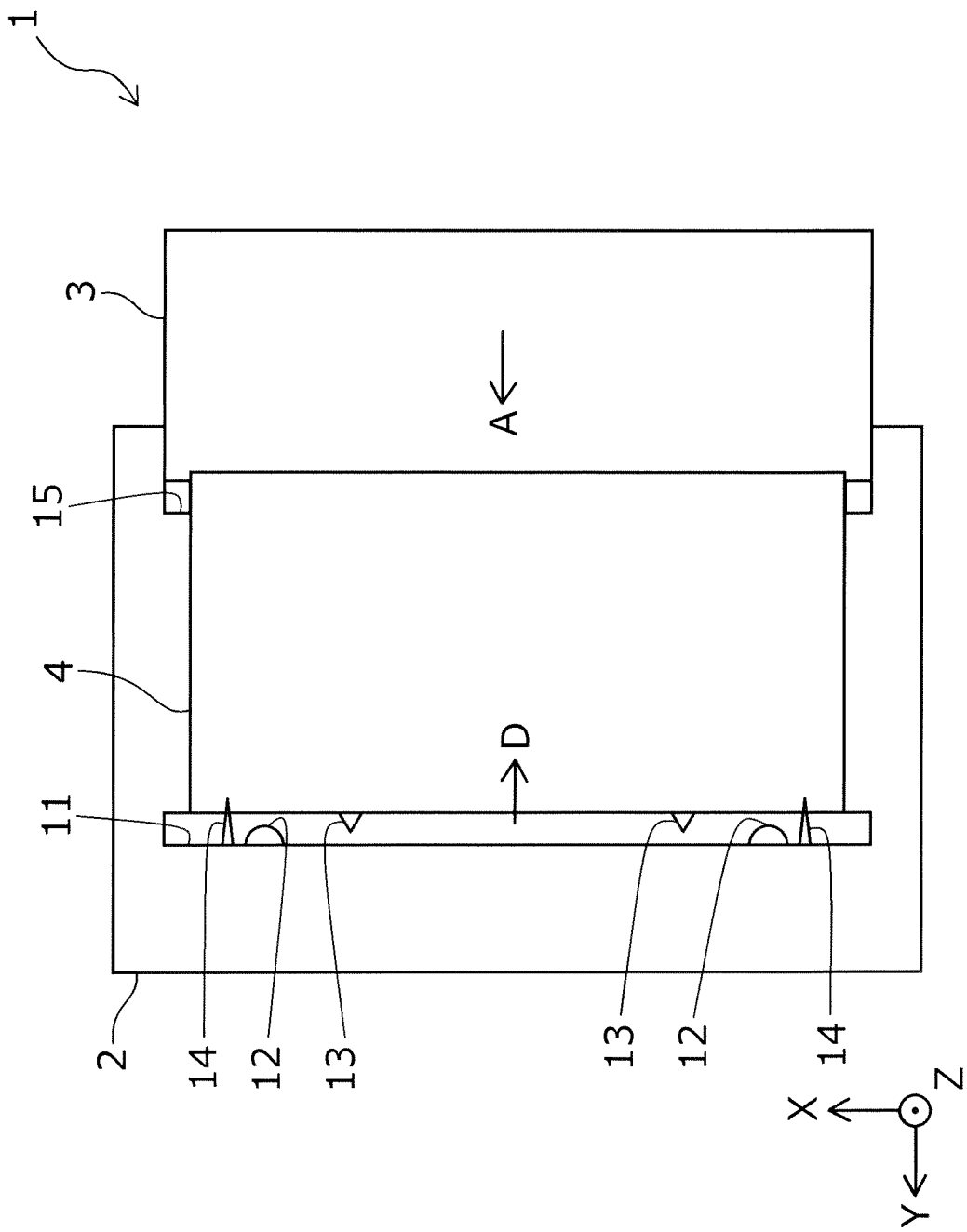
FIG. 5 is a schematic plan view illustrating the scanner of FIG. 1, in which the discharge stacker and the medium-support section are in the extended state.

The reading section 7 that includes a first reading unit 71 for reading an image of one surface of the document M and a second reading unit 72 for reading an image of the other surface of the document M is provided between the roller pair 6 and the roller pair 8. A curved path 10*a* on which the document M is transported in a curved state is provided downstream of the roller pair 8 in the transport direction B. A roller pair 9 for discharging, from the discharge port 11, the document M, an image of which has been read by the reading section 7, is provided in a portion of the curved path 10*a* furthest downstream in the transport direction B. The roller pair 9 is constituted by a driving roller 92 and a driven roller 91. As illustrated in FIG. 5 and the like, a medium detecting section 12, a strengthening member 13, and a medium-mounting-amount detecting section 14, detailed configurations of which will be described later, are provided near the discharge port 11.

Next, the discharge stacker 4 will be described in detail with reference to FIGS. 1 to 3. The discharge stacker 4 includes a rotational shaft 41, a first stacker 42, and a second stacker 43 and enables the second stacker 43 to be extended from and stored in the first stacker 42. The discharge stacker 4 is able to rotate about the rotational shaft 41 in the rotational direction C. The discharge stacker 4 is able to be displaced between an extended state in which the second stacker 43 is extended from the first stacker 42 and the discharge stacker 4 is located so as to expose the discharge port 11 provided in the housing section 2, as illustrated in FIG. 1, and a stored state in which the second stacker 43 is stored in the first stacker 42 and the discharge stacker 4 is located in a storage space 44 provided in the housing section 2, as illustrated in FIGS. 2 and 3. Here, as illustrated in FIG. 1, the discharge stacker 4 in the extended state includes a position facing the first mounting surface 3*a*.

The discharge stacker 4 is able to be located at not only the position indicated by the solid line in FIG. 1 but also the position indicated by the one-dot chain line in FIG. 1 so as to change the angle relative to the horizontal plane when the discharge stacker 4 is in the extended state. In the state indicated by the one-dot chain line in FIG. 1, the distance between the discharge stacker 4 and the medium-support section 3 increases compared with the state indicated by the solid line in FIG. 1, and the document M is thus easily mounted on the first mounting surface 3*a*; that is, the document M is easily set on the medium-support section 3.

Here, in both the state indicated by the solid line in FIG. 1 and the state indicated by the one-dot chain line in FIG. 1, when the discharge stacker 4 is in the extended state, a second mounting surface 4*a*, which is constituted by surfaces of the first stacker 42 and the second stacker 43, is inclined relative to the horizontal plane. The document M discharged in a discharge direction D by the roller pair 9 via the discharge port 11 is mounted on the second mounting surface 4*a*. Note that the discharge stacker 4 of the present embodiment is configured to enable the second stacker 43 to be extended from and stored in the first stacker 42, but the configuration is not limited thereto.

Figure 6:
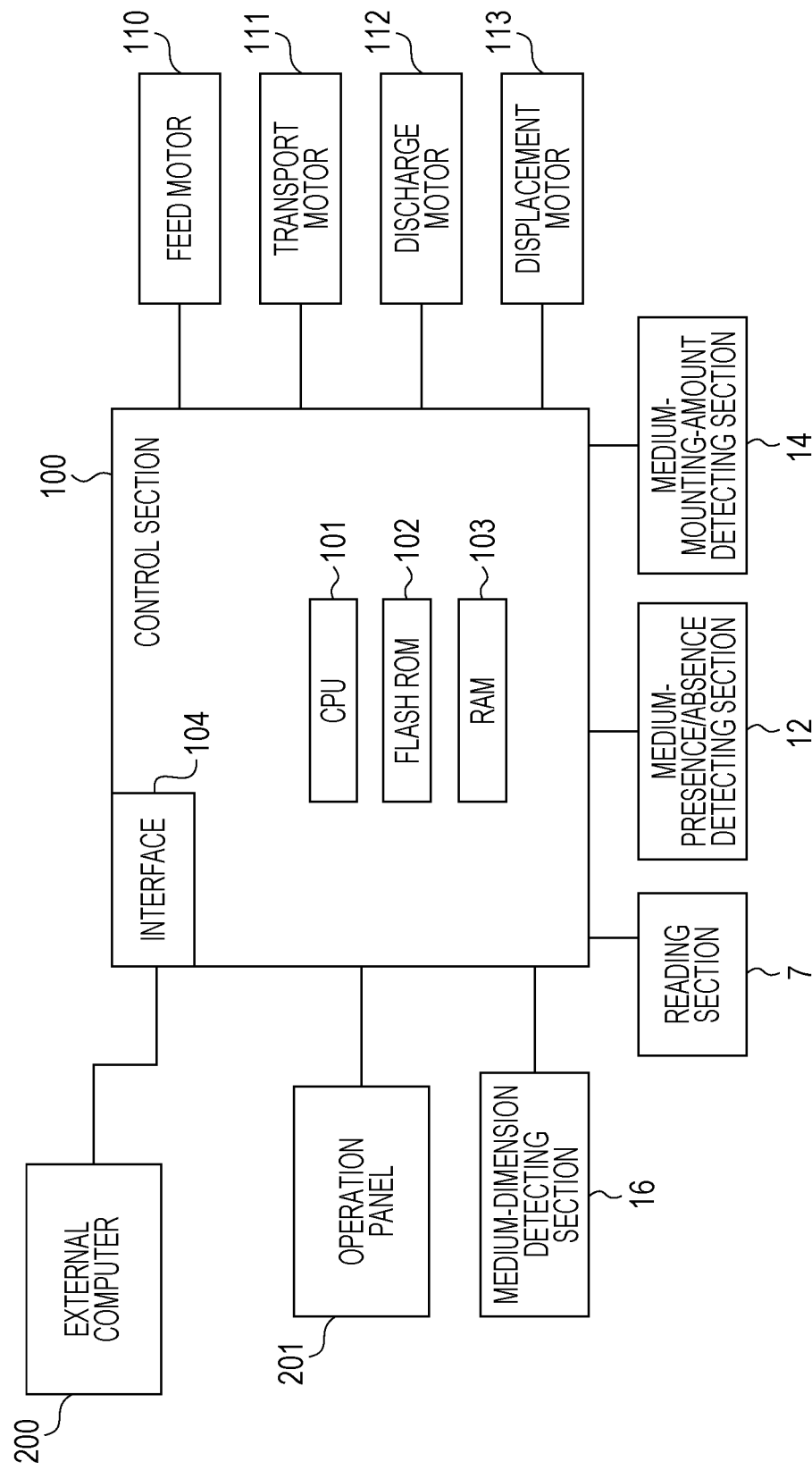
FIG. 6 is a block diagram illustrating an electrical configuration of the scanner of FIG. 1.

Next, an electrical configuration of the scanner 1 of the present embodiment will be described with reference to FIG. 6. A control section 100 performs various kinds of control of the scanner 1, including control of feeding, transporting, discharging, and reading the document M, and other types of control. The control section 100 performs, for example, control of switching the discharge stacker 4 between the extended state and the stored state and control of changing the angle of the discharge stacker 4 relative to the horizontal plane when the discharge stacker 4 is in the extended state.

A signal from an operation panel 201 is input to the control section 100, and a signal for performing display on the operation panel 201, particularly, for implementing a user interface, is transmitted from the control section 100 to the operation panel 201. Note that the scanner 1 of the present embodiment is configured to include the operation panel 201 but may have a configuration in which, for example, only a simple button that enables operation of inputting only a limited instruction, such as an instruction for transporting the document, is provided instead of the operation panel 201 and in which a detailed instruction is mainly issued by an external computer 200 to the scanner 1.

The control section 100 controls motors of a feed motor 110 for driving the driving roller 51, a transport motor 111 for driving the driving roller 62 and the driving roller 82, a discharge motor 112 for driving the driving roller 92, and a displacement motor 113 for displacing the discharge stacker 4 in terms of dimension and angle. In the present embodiment, the respective motors are DC motors. Data read from the reading section 7 is input to the control section 100, and a signal for controlling the reading section 7 is transmitted from the control section 100 to the reading section 7. Signals from detecting sections of the medium detecting section 12, the medium-mounting-amount detecting section 14, and a medium-dimension detecting section 16, which is not illustrated in FIGS. 1 to 5, are also input to the control section 100. Furthermore, detected values of rotary encoders (not illustrated) provided in the motors of the feed motor 110, the transport motor 111, the discharge motor 112, and the displacement motor 113 are also input to the control section 100, and the control section 100 is thereby able to determine the rotational speed of each motor and is also able to determine the operation amount of a driving target.

The control section 100 includes a CPU 101, flash ROM 102, and RAM 103. The CPU 101 performs various types of computational processing in accordance with a program stored in the flash ROM 102 and controls the overall operation of the scanner 1. The flash ROM 102, which is an example of a storage unit, is readable-and-writable non-volatile memory. Various kinds of setting information input by the user via the external computer 200 or the operation panel 201 are also stored in the flash ROM 102. Various kinds of information are temporarily stored in the RAM 103, which is an example of a storage unit. The control section 100 includes an interface 104 and is able to communicate with the external computer 200 via the interface 104.

Figure 7:
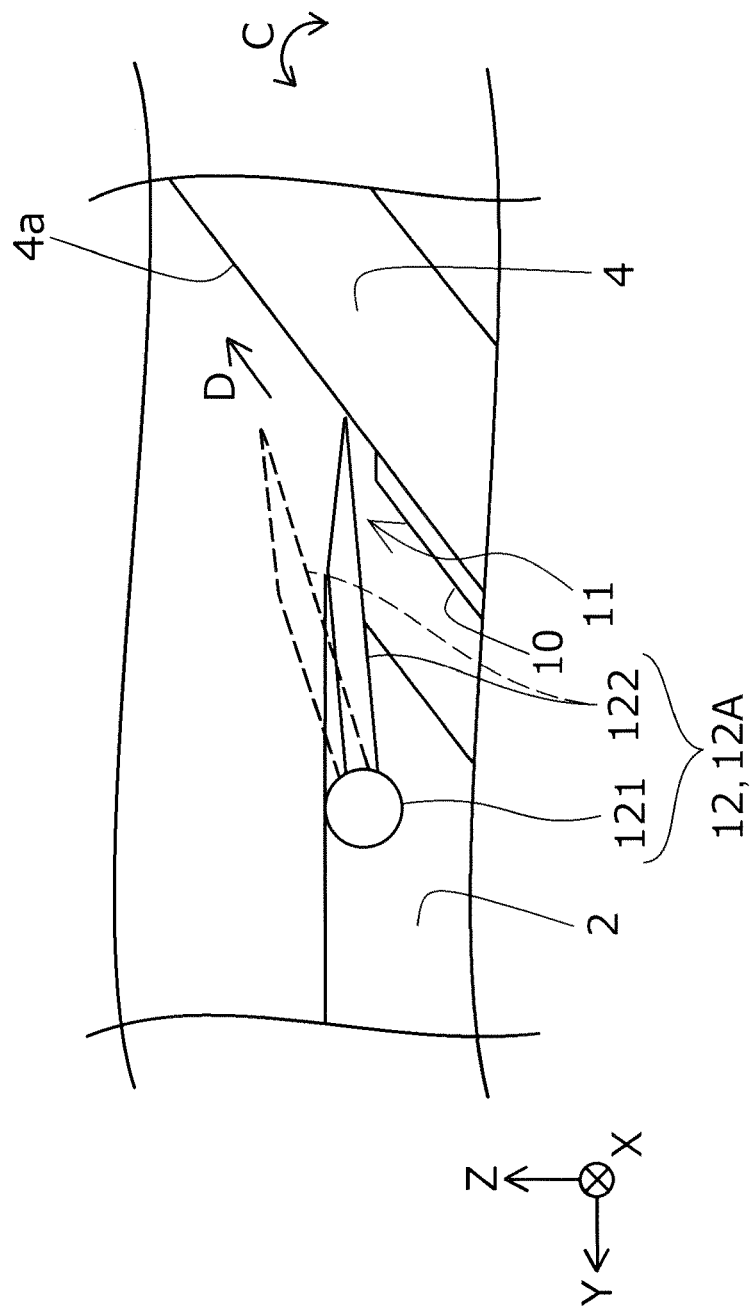
FIG. 7 is a schematic side view illustrating an example of a medium detecting section.
Figure 8:
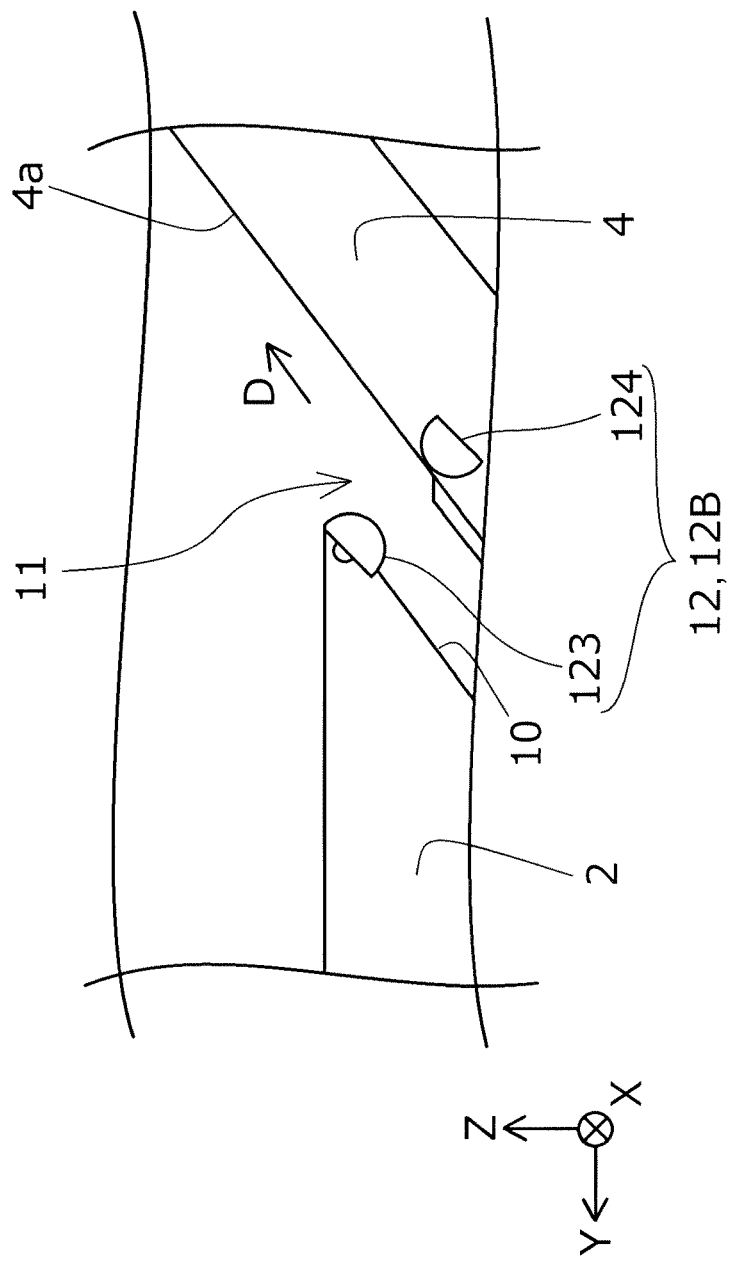
FIG. 8 is a schematic side view illustrating an example of a medium detecting section different from the medium detecting section of FIG. 7.

Next, an example of the configuration of the medium detecting section 12 will be described with reference to FIGS. 7 and 8. As illustrated in FIG. 5, the medium detecting section 12 of the present embodiment is provided near each end of the discharge port 11 in the X-axis direction. Note that the number of medium detecting sections 12 installed and the arrangement thereof are not particularly limited. Additionally, the configuration of the medium detecting section 12 is not limited.

A medium detecting section 12A illustrated in FIG. 7 will be described below as the medium detecting section 12 applicable to the scanner 1 of the present embodiment. The medium detecting section 12A includes a rotational shaft 121 capable of rotating in the rotational direction C and a bar-shaped member 122 extending from the rotational shaft 121 to the second mounting surface 4*a* of the discharge stacker 4. When the document M discharged from the discharge port 11 is mounted on the second mounting surface 4*a*, the bar-shaped member 122 moves from the position indicated by the solid line in FIG. 7 to the position indicated by the broken line in FIG. 7. Here, the medium detecting section 12A is electrically coupled to the control section 100, and the control section 100 is able to determine whether or not the document M is mounted on the second mounting surface 4*a* in accordance with displacement of the bar-shaped member 122.

A medium detecting section 12B illustrated in FIG. 8 will be described below as the medium detecting section 12 applicable to the scanner 1 of the present embodiment. The medium detecting section 12B includes a light-emitting section 123 for emitting light and a light-receiving section 124 for receiving the light. Here, a region between the light-emitting section 123 and the light-receiving section 124 is constituted by a portion of the transport path 10 of the document M. The medium detecting section 12B is electrically coupled to the control section 100. Such a configuration enables the control section 100 to determine whether or not the document M is mounted on the second mounting surface 4*a* in accordance with whether or not light projected toward the light-receiving section 124 is shielded by the document M.

Figure 9:
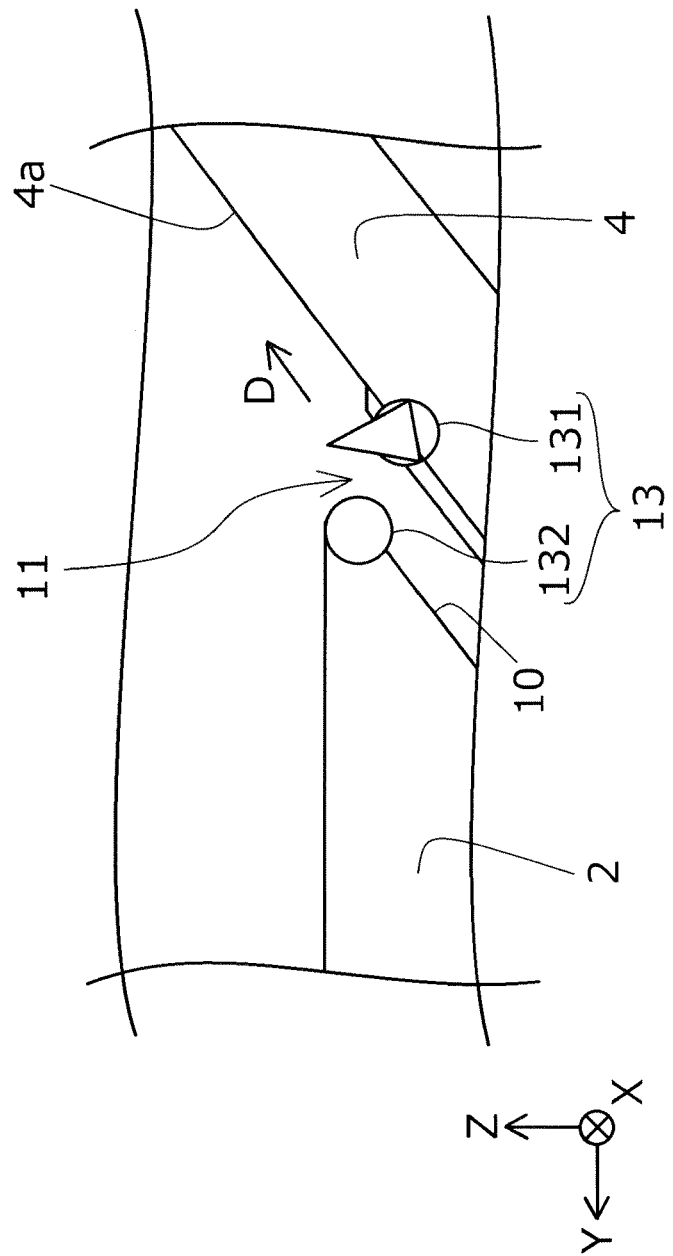
FIG. 9 is a schematic side view illustrating an example of a strengthening member.

Next, an example of the configuration of the strengthening member 13 will be described with reference to FIG. 9. As illustrated in FIG. 5, the strengthening member 13 of the present embodiment is provided at two locations which are on end sides of the discharge port 11 in the X-axis direction and which are closer than the medium detecting section 12 to the center. Note that the number of strengthening members 13 installed and the arrangement thereof are not particularly limited. Additionally, the configuration of the strengthening member 13 is not limited.

The strengthening member 13 of the present embodiment includes a rib-forming member 131 on the second mounting surface 4*a* side on the transport path 10 of the document M and a document pressing member 132 on the side facing the rib-forming member 131 on the transport path 10. Here, the document pressing member 132 is provided on the center side in the X-axis direction with respect to the rib-forming member 131. Thus, the document M to be discharged from the discharge port 11 is discharged to the second mounting surface 4*a* while in contact with two document pressing members 132 and two rib-forming members 131, and the document M is thereby discharged while forming a U-shape in which a central portion of the document M as viewed in the discharge direction D is projected to the second mounting surface 4*a* side. Since the document M is discharged as described above, for example, even when the document M is not stiff and readily causes a discharge failure, the document M is able to be discharged to the second mounting surface 4*a* without causing a discharge failure.

Figure 10:
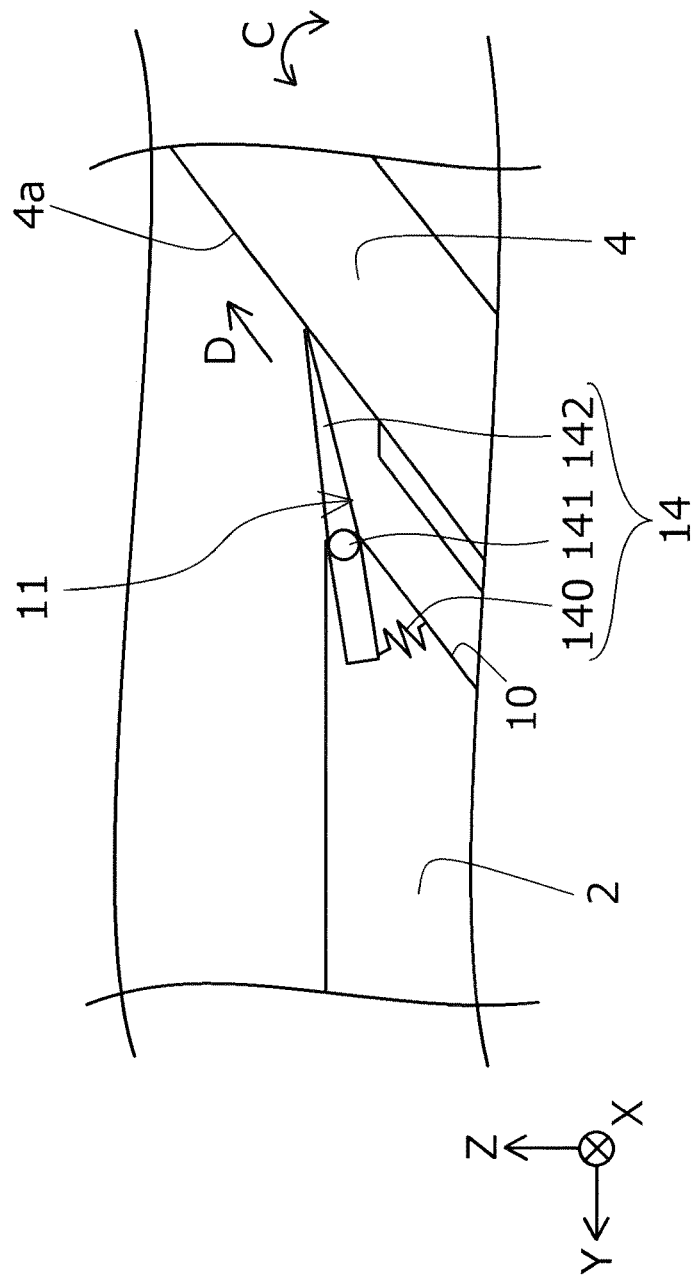
FIG. 10 is a schematic side view illustrating an example of a medium-mounting-amount detecting section.

Next, an example of the configuration of the medium-mounting-amount detecting section 14 will be described with reference to FIG. 10. As illustrated in FIG. 5, the medium-mounting-amount detecting section 14 of the present embodiment is provided on each end side of the discharge port 11 in the X-axis direction so as to be closer than the medium detecting section 12 to the end side. Note that the number of medium-mounting-amount detecting sections 14 installed and the arrangement thereof are not particularly limited. Additionally, the configuration of the medium-mounting-amount detecting section 14 is not limited.

The medium-mounting-amount detecting section 14 includes a rotational shaft 141 capable of rotating in the rotational direction C, a bar-shaped member 142 extending from the rotational shaft 141 to the second mounting surface 4*a* of the discharge stacker 4, and a spring member 140 having one end coupled to the bar-shaped member 142 and the other end coupled to the housing section 2. A force applied to the spring member 140 changes in accordance with the amount of documents M mounted on the second mounting surface 4*a*. Here, the medium-mounting-amount detecting section 14 is electrically coupled to the control section 100, and the control section 100 is able to determine whether or not the amount of documents M mounted on the second mounting surface 4*a* is equal to or more than an upper limit value in accordance with a change in the force applied to the spring member 140. Note that the medium-mounting-amount detecting section 14 of the present embodiment is configured to determine the number of documents M mounted on the second mounting surface 4*a* in accordance with the thickness of the documents M mounted on the second mounting surface 4*a* and to determine whether or not the amount has reached the upper limit value indicating the amount of documents M mountable on the second mounting surface 4*a*. Note that the medium-mounting-amount detecting section 14 may be configured, for example, to count the number of documents M mounted on the second mounting surface 4*a* and to determine whether or not the amount has reached the upper limit value indicating the amount of documents M mountable on the second mounting surface 4*a* in accordance with the counted number or may be configured to determine whether or not the amount has reached the upper limit value indicating the amount of documents M mountable on the second mounting surface 4*a* in accordance with, for example, the weight of documents M mounted on the second mounting surface 4*a*.

Next, an example of a method of controlling movement of the discharge stacker 4 in association with reading processing, which is able to be performed by the scanner 1 of the present embodiment, will be described. The control section 100 of the present embodiment is able to perform, after the document M discharged along the transport path 10 is discharged to the second mounting surface 4*a*, first control of automatically switching the discharge stacker 4 from the extended state to the stored state such that a portion of the document mounted on the second mounting surface 4*a* is mounted on the first mounting surface 3*a*. The control section 100 is also able to perform second control of not switching the discharge stacker 4 from the extended state to the stored state such that the document discharged along the transport path 10 remains mounted on the second mounting surface 4*a*. Here, first, an example of performing the first control will be described with reference to the flowchart of FIG. 11 and FIGS. 12 and 13.

Figure 11:
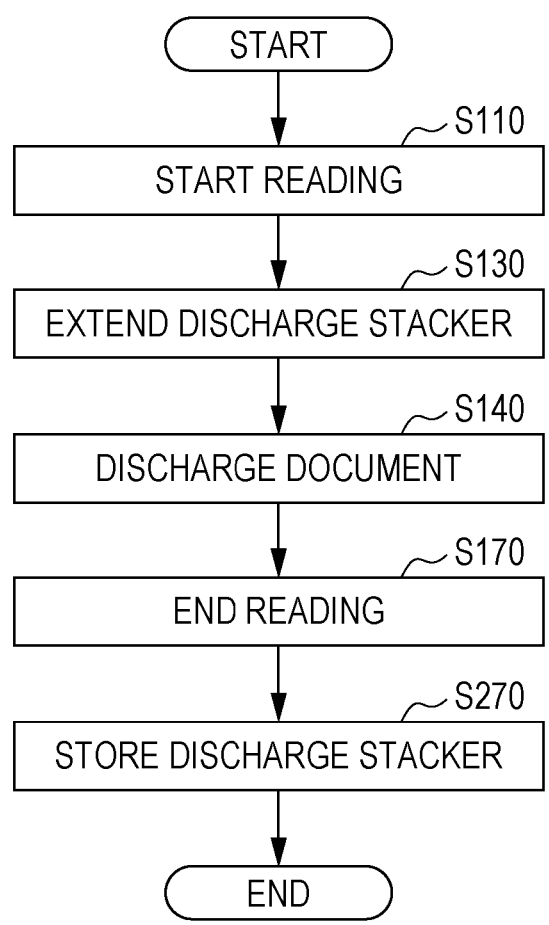
FIG. 11 is a flowchart indicating an example of performing first control of automatically storing the discharge stacker upon ending document reading processing.

As indicated by the flowchart of FIG. 11, when the method of controlling movement of the discharging stacker 4 in association with reading processing starts, reading processing starts in step S110. Here, reading processing refers to an operation of transporting the document M mounted on the first mounting surface 3*a*, reading an image by using the reading section 7, and discharging the document M to the second mounting surface 4a of the discharge stacker 4.

After the reading processing starts in step S110, the discharge stacker 4 is extended by a desired distance in step S130. Since the scanner 1 of the present embodiment includes the medium-dimension detecting section 16 capable of detecting the dimension of the document M in the transport direction B, it is possible to determine an extended amount of the discharge stacker 4 in accordance with the dimension of the document M detected by the medium-dimension detecting section 16. Note that the dimension of the document M may be input from the external computer 200 or the like.

In step S140, the document M, the image of which has been read by the reading section 7, is discharged to the second mounting surface 4a of the discharge stacker 4.

When the control section 100 determines that no document M is on the first mounting surface 3a and determines that the reading processing is to be ended, the reading processing ends in step S170. A sensor for detecting the presence/absence of the document M on the first mounting surface 3a may be provided, and the control section 100 may determine whether no document M is on the first mounting surface 3a in accordance with the detection result from the sensor. Moreover, the number of documents M to be read may be specified by the user via the external computer 200 or the like, and the determination may be performed in accordance with the specified number.

The discharge stacker 4 is brought into the stored state in step S270, and the method of controlling movement of the discharge stacker 4 in association with reading processing ends.

Figure 12:
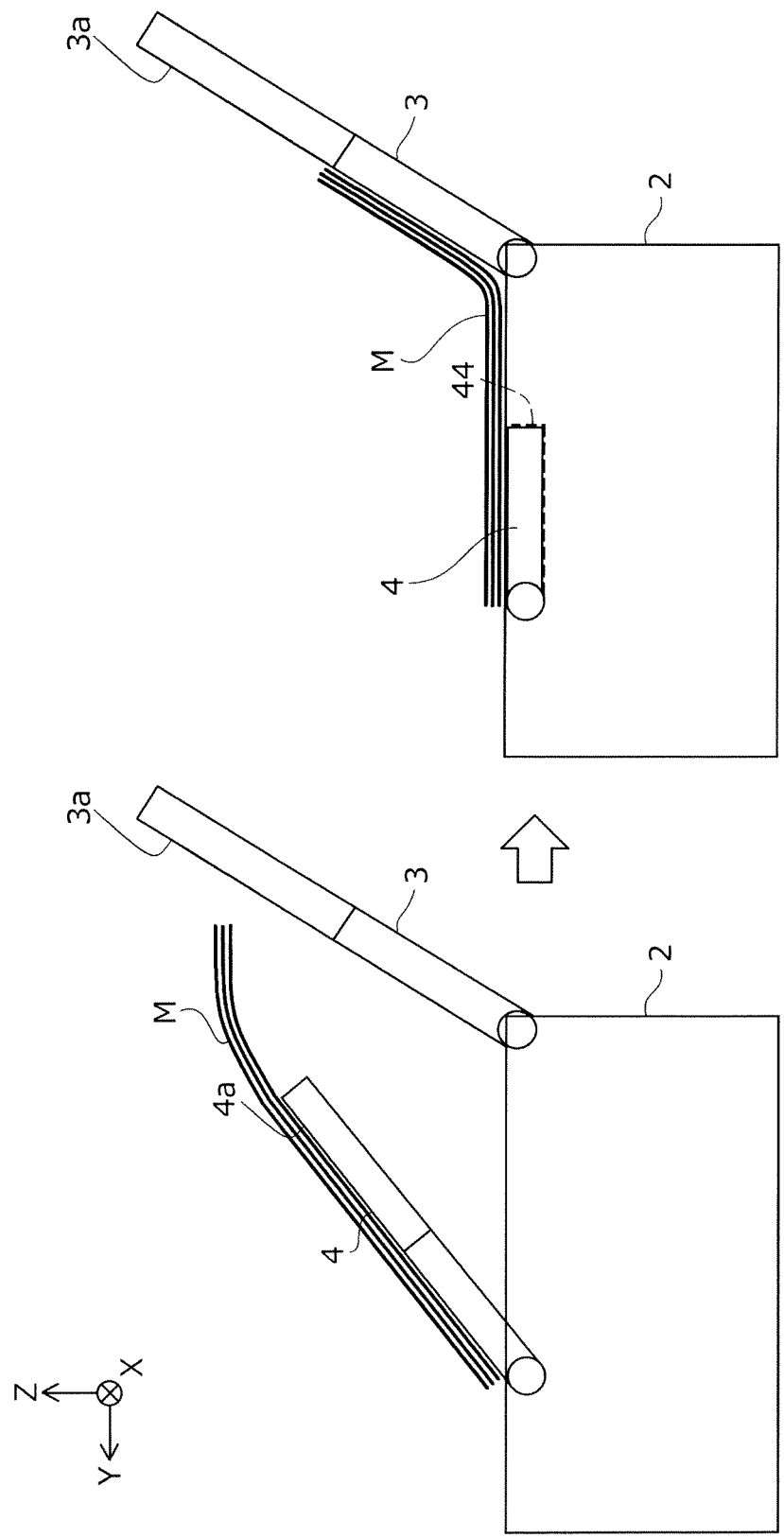
FIG. 12 schematically illustrates an example of an instance in which a stiff document is used and in which the discharge stacker is automatically stored when document reading processing ends.
Figure 13:
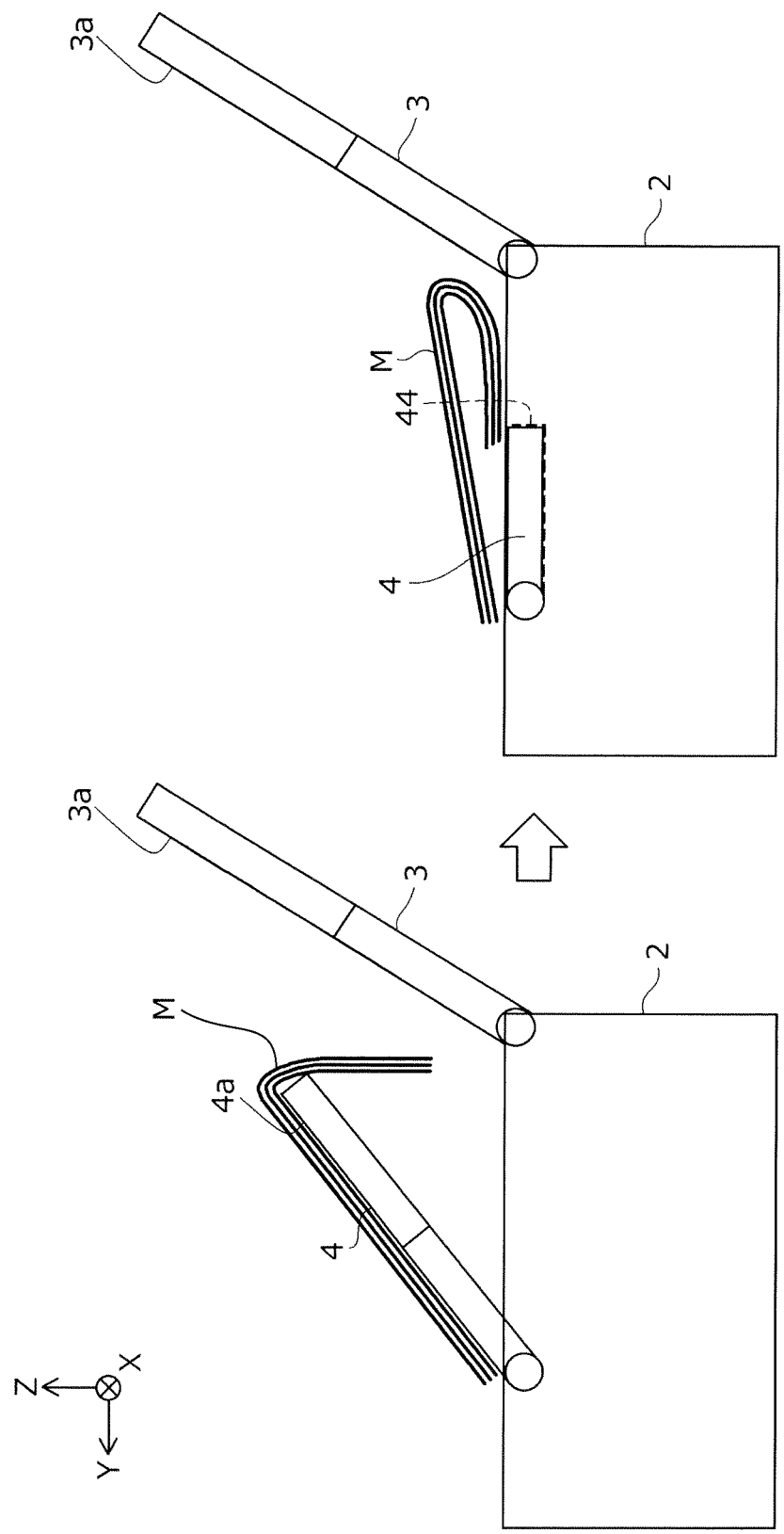
FIG. 13 schematically illustrates an example of an instance in which a document that is not stiff is used and in which the discharge stacker is automatically stored when document reading processing ends.

Here, in an instance in which the document M subjected to reading processing is stiff, when the discharge stacker 4 is displaced to the stored state as illustrated on the right side in FIG. 12 from a state in which the document M is mounted on the second mounting surface 4a of the discharge stacker 4 in the extended state as illustrated on the left side in FIG. 12, the document M is easily mounted on the first mounting surface 3a of the medium-support section 3. On the other hand, in an instance in which the document M subjected to reading processing is not stiff, when the discharge stacker 4 is displaced to the stored state as illustrated on the right side in FIG. 13 from a state in which the document M is mounted on the second mounting surface 4a of the discharge stacker 4 in the extended state as illustrated on the left side in FIG. 13, for example, a portion of the document M which is curved downward from the discharge stacker 4 may be jammed in the discharge stacker 4, and the document M may be damaged or cause other problems.

Thus, the scanner 1 of the present embodiment is able to perform the second control of not switching the discharge stacker 4 from the extended state to the stored state as described above. Here, the second control will be described with reference to the flowcharts of FIGS. 14 to 17. Note that the same steps in the flowcharts of FIGS. 11 and 14 to 17 will be given the same step numbers. Thus, description of a step having a step number already mentioned will be omitted. In the scanner 1 of the present embodiment, a mode regarding each method of controlling movement of the discharge stacker 4 in association with reading processing indicated by the flowcharts of FIGS. 11 and 14 to 17 is able to be selected by any of the external computer 200 and the operation panel 201. Note that the configuration may be such that the mode is able to be selected by either the external computer 200 or the operation panel 201.

A method of controlling movement of the discharge stacker 4 in association with reading processing indicated by the flowchart of FIG. 14 will be described below. When step S140 ends, skewing detection for determining whether or not the document M is transported in a skewed manner on the transport path 10 is performed in step S150. Since the scanner 1 of the present embodiment includes two medium detecting sections 12 in the X-axis direction, skewing is able to be detected in accordance with a time lag in detection of the document M. When the control section 100 determines that skewing occurs, the procedure proceeds to step S260 to stop the reading processing and end the method of controlling movement of the discharge stacker 4 in association with reading processing. When the control section 100 determines that skewing does not occur, the procedure proceeds to step S160.

In step S160, the control section 100 determines whether or not the amount of documents M mounted on the second mounting surface 4a of the discharge stacker 4 is equal to or more than the upper limit value. The determination is performed in accordance with the detection result from the medium-mounting-amount detecting section 14. When the control section 100 determines that the amount of documents M mounted on the second mounting surface 4a is equal to or more than the upper limit value, the procedure proceeds to step S260 to stop the reading processing and end the method of controlling movement of the discharge stacker 4 in association with reading processing. When the control section 100 determines that the amount of documents M mounted on the second mounting surface 4a is not equal to or more than the upper limit value, the procedure proceeds to step S170.

After step S170 ends, the document M remains on the discharge stacker 4 in step S200.

The procedure then proceeds to step S220, and the control section 100 determines whether or not a document M is on the discharge stacker 4. The determination is performed in accordance with the detection result from the medium detecting section 12. Here, when the control section 100 determines that a document M is on the discharge stacker 4, the procedure proceeds to step S240, and when the control section 100 determines that no document M is on the discharge stacker 4, the procedure proceeds to step S270. That is, when a document M is on the discharge stacker 4, the discharge stacker 4 is not brought into the stored state, and when it is determined that no document M is on the discharge stacker 4, the discharge stacker 4 is brought into the stored state.

In step S240, the control section 100 determines whether or not a document is on the medium-support section 3. When the control section 100 determines that a document M is on the medium-support section 3, the procedure returns to step S140 to perform processing of reading the next document M, and when the control section 100 determines that no document is on the medium-support section 3, the procedure returns to step S200. Note that step S240 is performed after the control section 100 determines in step S220 that a document M is on the discharge stacker 4, that is, the document M is discharged to the discharge stacker 4, and therefore, when the medium detecting section 12 detects the presence of a document M on the discharge stacker 4 and when a new document M is on the medium-support section 3, processing of reading the new document M starts.

Next, a method of controlling movement of the discharge stacker 4 in association with reading processing indicated by the flowchart of FIG. 15 will be described. The method of controlling movement of the discharge stacker 4 in association with reading processing indicated by the flowchart of FIG. 15 corresponds to an addition mode in which the user adds a single document M to the medium-support section 3 for each reading processing of the single document M such that reading processing is performed while documents M are added one by one. Note that, according to the method of controlling movement of the discharge stacker 4 in association with reading processing, in which only the first control is able to be performed, as indicated by the flowchart of FIG. 14, since the supply port 15 is closed by the document M discharged from the discharge port 11 as indicated on the right side in FIG. 12 in association with displacement of the discharge stacker 4 to the stored state, the addition mode is not able to be performed.

Figure 14:
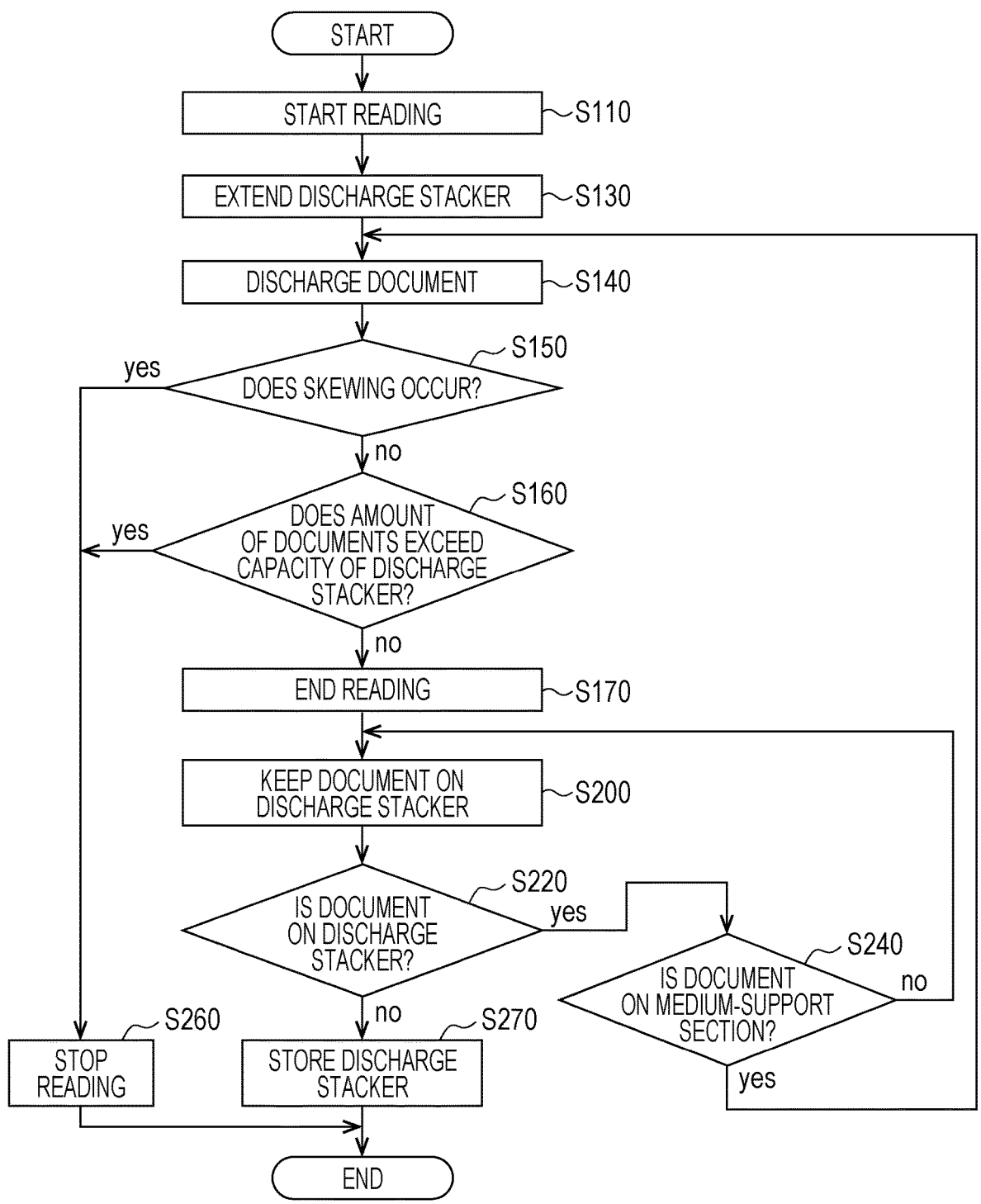
FIG. 14 is a flowchart indicating an example in which second control of not automatically storing the discharge stacker upon ending document reading processing is able to be performed.
Figure 15:
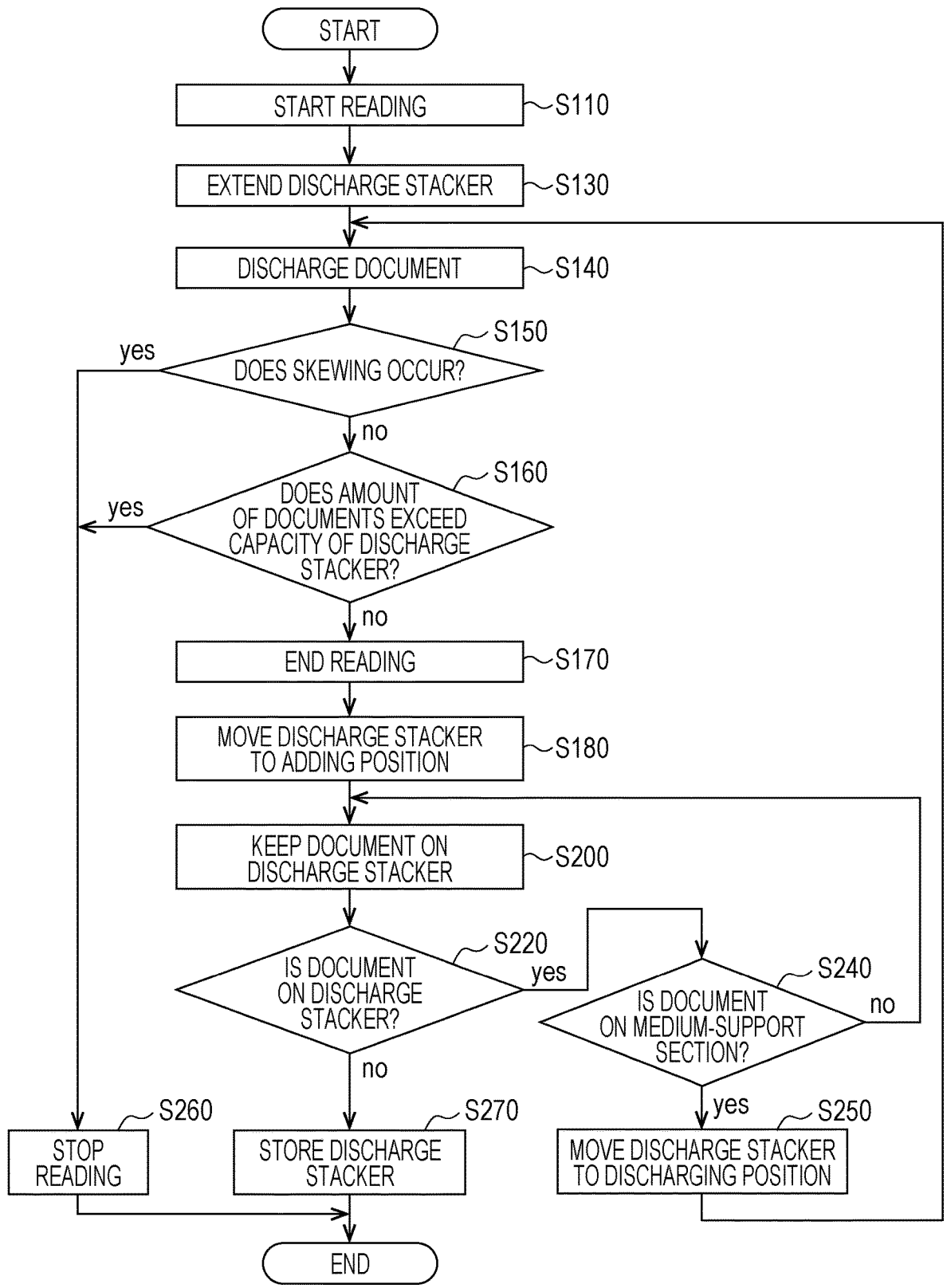
FIG. 15 is a flowchart of an instance in which each document is able to be read while a plurality of documents are added and indicates an example in which the second control is able to be performed.

In the method of controlling movement of the discharge stacker 4 in association with reading processing indicated by the flowchart of FIG. 15, after step S170 ends, the discharge stacker 4 is moved to an adding position in step S180, which differs from the method of controlling movement of the discharge stacker 4 in association with reading processing indicated by the flowchart of FIG. 14. The adding position corresponds to the position of the discharge stacker 4 indicated by the one-dot chain line in FIG. 1. Moving the discharge stacker 4 to the adding position enables the user to easily set the document M on the medium-support section 3. After step S180 ends, the procedure proceeds to step S200.

In the method of controlling movement of the discharge stacker 4 in association with reading processing indicated by the flowchart of FIG. 15, after step S240 ends, the procedure proceeds to step S250. In step S250, the discharge stacker 4 is moved to a discharging position. The discharging position corresponds to the position of the discharge stacker 4 indicated by the solid line in FIG. 1. After step S250 ends, the procedure returns to step S140.

Next, a method of controlling movement of the discharge stacker 4 in association with reading processing indicated by the flowchart of FIG. 16 will be described. The method of controlling movement of the discharge stacker 4 in association with reading processing indicated by the flowchart of FIG. 16 corresponds to a user-instruction waiting mode in which the discharge stacker 4 is not brought into the stored state until an instruction is issued by the user.

Figure 16:
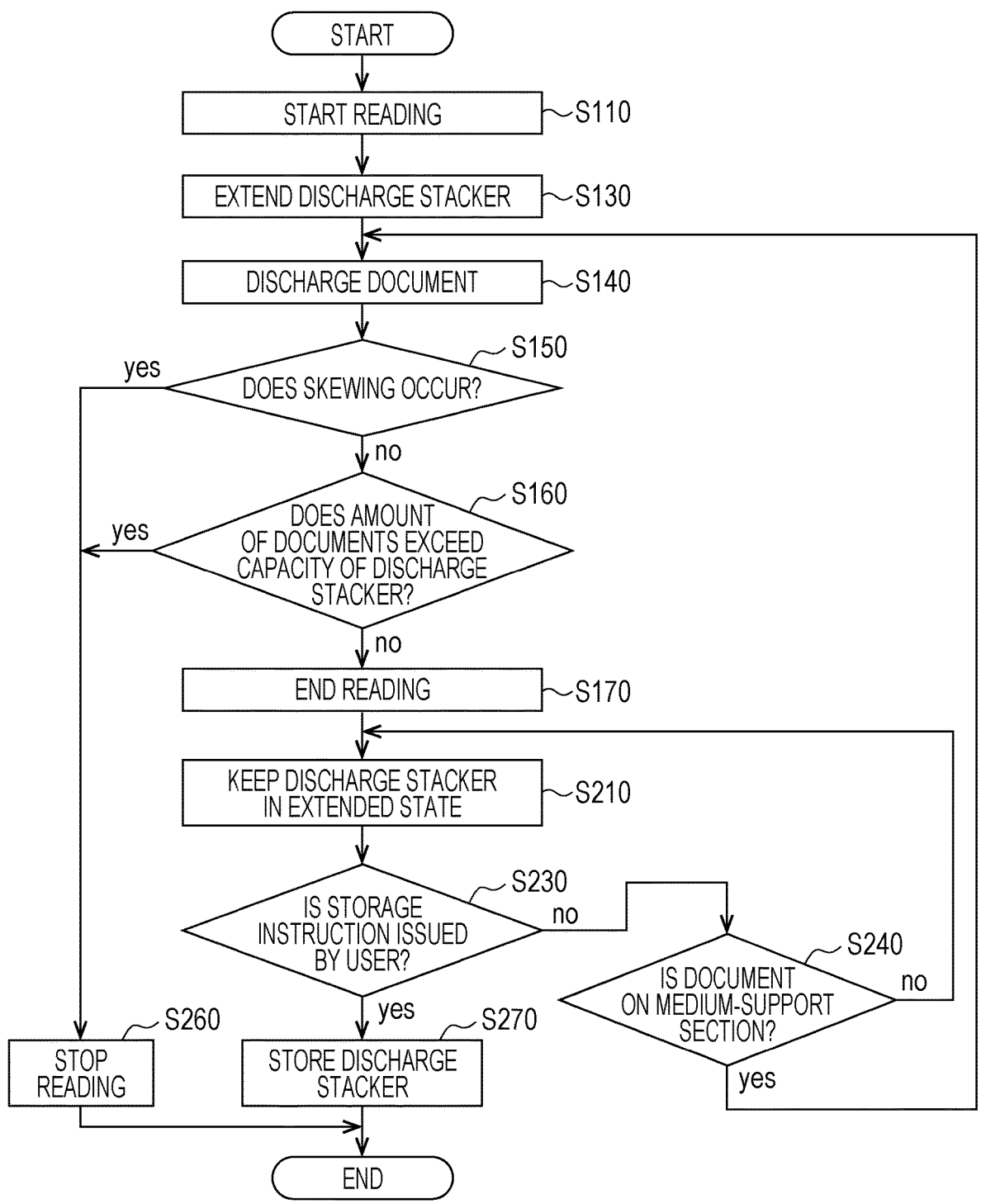
FIG. 16 is a flowchart of an instance in which the discharge stacker is brought into the stored state when an instruction is issued by a user and indicates an example in which the second control is able to be performed.

In the method of controlling movement of the discharge stacker 4 in association with reading processing indicated by the flowchart of FIG. 16, after step S170 ends, the discharge stacker 4 is kept in the extended state in step S210, which differs from the method of controlling movement of the discharge stacker 4 in association with reading processing indicated by the flowchart of FIG. 14. The procedure then proceeds to step S230.

In step S230, the control section 100 determines whether or not a storage instruction is issued by the user. Here, when the control section 100 determines that no storage instruction is issued by the user, the procedure proceeds to step S240, and when the control section 100 determines that a storage instruction is issued by the user, the procedure proceeds to step S270. That is, when no storage instruction is issued by the user, the discharge stacker 4 is not brought into the stored state, and after a storage instruction is issued by the user, the discharge stacker 4 is brought into the stored state. The storage instruction issued by the user is able to be input from the external computer 200, the operation panel 201, or the like.

Figure 17:
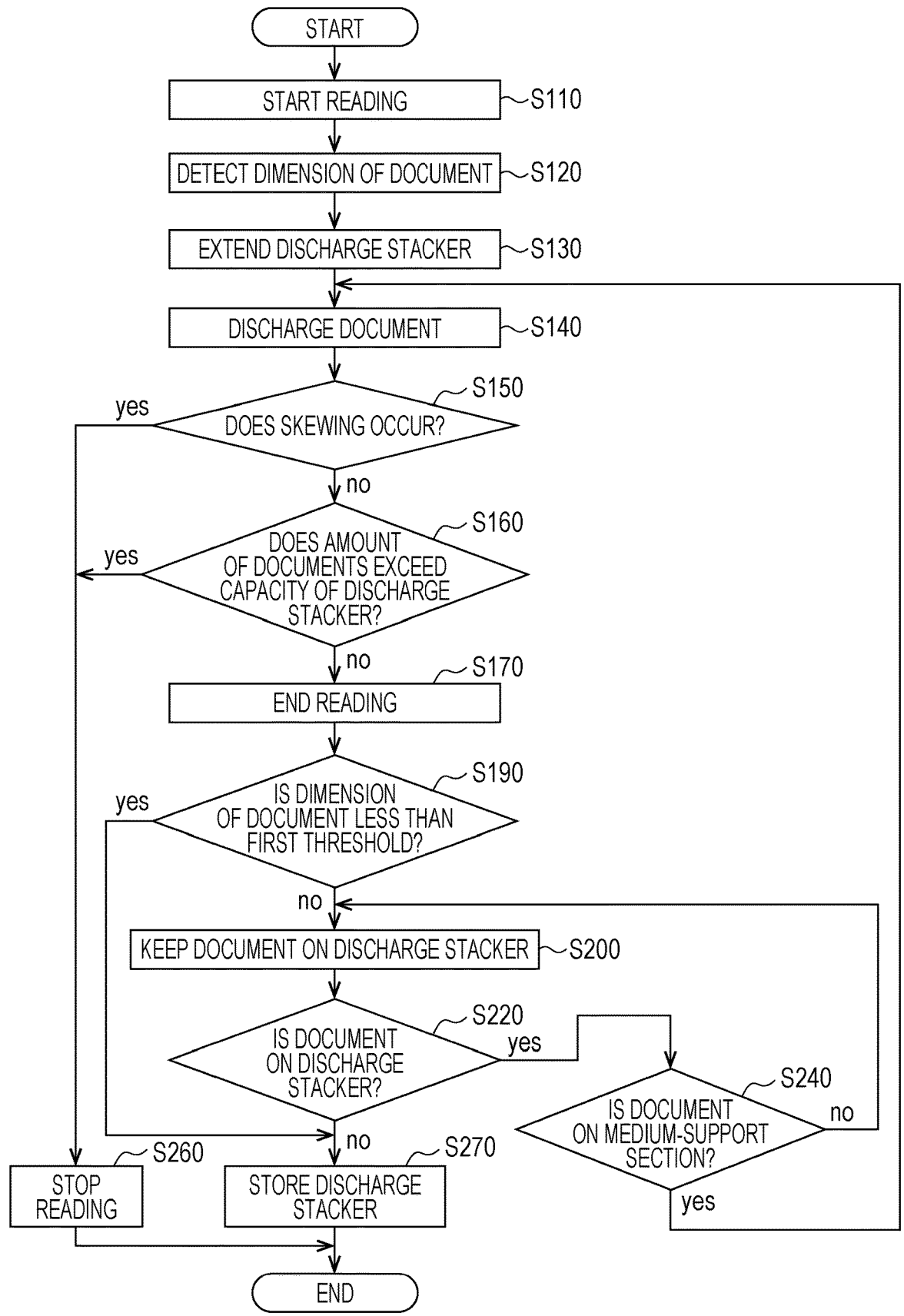
FIG. 17 is a flowchart of an instance in which the first control or the second control is selected and performed in accordance with a dimension of a document.

Next, a method of controlling movement of the discharge stacker 4 in association with reading processing indicated by the flowchart of FIG. 17 will be described. The method of controlling movement of the discharge stacker 4 in association with reading processing indicated by the flowchart of FIG. 17 is performed only when the dimension of the document M in the transport direction B is equal to or more than a first threshold. In other words, the first control is performed when the dimension of the document M is less than the first threshold.

In the method of controlling movement of the discharge stacker 4 in association with reading processing indicated by the flowchart of FIG. 17, after step S110 ends, the dimension of the document M is detected in step S120, which differs from the method of controlling movement of the discharge stacker 4 in association with reading processing indicated by the flowchart of FIG. 14. In step S130, an extended amount of the discharge stacker 4 is optimized in accordance with the dimension of the document M detected in step S120.

After step S170 ends, whether or not the dimension of the document M detected in step S120 is less than the first threshold is determined in step S190. When the control section 100 determines that the dimension of the document M is less than the first threshold, the procedure proceeds to step S270, and when the control section 100 determines that the dimension of the document M is equal to or more than the first threshold, the procedure proceeds to step S200. That is, when the document M is a short medium having a dimension which is less than the first threshold, the first control of bringing the discharge stacker 4 into the stored state is performed in step S270 regardless of whether or not a document M is on the discharge stacker 4. On the other hand, when the document M is a long medium having a dimension which is equal to or more than the first threshold, the second control of bringing the discharge stacker 4 into the stored state is performed in step S270 when it is determined that no document M is on the discharge stacker 4.

As described above, the scanner 1 of the present embodiment is able to perform the first control of switching the discharge stacker 4 from the extended state to the stored state such that a portion of the document M mounted on the second mounting surface 4*a* is mounted on the first mounting surface 3*a* and the second control of not switching the discharge stacker 4 from the extended state to the stored state such that the document M discharged along the transport path 10 remains mounted on the second mounting surface 4*a*. That is, the scanner 1 of the present embodiment is able to perform, in addition to the first control of storing the discharge stacker 4 in the scanner 1, the second control of not storing the discharge stacker 4 in the scanner 1. Thus, it is possible to inhibit the document M from being damaged upon storing of the discharge stacker 4 that is able to be stored in the scanner 1.

To give description from the viewpoint of the image reading apparatus, the scanner 1 of the present embodiment includes the reading section 7 for reading an image of the document M on the transport path 10 and the medium-transporting device for transporting the document M. Thus, it is possible to inhibit the document M, the image of which has been read, from being damaged upon storing of the discharge stacker 4.

As indicated by the flowchart of FIG. 15, the scanner 1 of the present embodiment has the addition mode in which, after a document M is discharged to the second mounting surface 4*a*, a new document M is added to the first mounting surface 3*a* and transported. The control section 100 performs the second control in the addition mode. In this manner, due to the presence of the addition mode, each document M is able to be transported while documents M are added one by one. By performing the second control in the addition mode, the document M, the image of which has been read, remains mounted on the second mounting surface 4a, thus making it possible to inhibit the document M, which has been transported along the transport path 10 and discharged to the discharge stacker 4, from reaching the first mounting surface 3a when a new document M is added and to inhibit the document M from interfering with adding a new document M.

As described above, in the addition mode, the control section 100 is able to, after the document M is discharged to the second mounting surface 4a, displace the discharge stacker 4 such that an inclination angle of the second mounting surface 4a relative to the horizontal plane increases as indicated by the one-dot chain line in FIG. 1. Thus, according to the scanner 1 of the present embodiment, when a new document M is added, a distance between the first mounting surface 3a and the second mounting surface 4a increases, thus making it possible to facilitate adding the new document M.

As indicated by the flowchart of FIG. 17, the control section 100 is able to perform either the first control or the second control in accordance with the dimension of the document M. Here, when the document M has a long dimension, the document M is readily damaged upon storing of the discharge stacker 4. However, the scanner 1 of the present embodiment performs either the first control or the second control in accordance with the dimension of the document M. The scanner 1 performs the second control when the document M has a long dimension and performs the first control when the document M has a short dimension, thus making it possible to effectively inhibit the document M from being damaged.

The scanner 1 of the present embodiment includes the medium-dimension detecting section 16 for detecting the dimension of the document M, and as indicated by the flowchart of FIG. 17, when the dimension of the document M detected by the medium-dimension detecting section 16 is equal to or more than the first threshold, the control section 100 is able to perform the second control. Thus, when a long document M that is readily damaged is used, the second control of not switching the discharge stacker 4 from the extended state to the stored state is performed, thus making it possible for the scanner 1 of the present embodiment to inhibit the document M from being jammed in the discharge stacker 4 and being damaged.

Here, alternately stated, when the dimension of the document M detected by the medium-dimension detecting section 16 is equal to or less than the second threshold, the control section 100 is able to perform the first control. Thus, when a short document M that is difficult to be damaged is used, the scanner 1 of the present embodiment enables a size reduction in the device. In an instance in which a short document M is used, for example, when a new medium is added in the addition mode, it is possible to inhibit the document M that has been transported along the transport path 10 and discharged to the discharge stacker 4 from reaching the first mounting surface 3a and to inhibit the document M from interfering with adding a new document M. Note that, in the present embodiment, since a single threshold is provided, the first threshold and the second threshold have the same value, but the first threshold and the second threshold may have different values. In such an instance, further different control may be performed when the dimension of the document M is less than the second threshold and exceeds the first threshold.

In the scanner 1 of the present embodiment, a distance by which the discharge stacker 4 in the extended state is extended is variable, and the control section 100 is able to change, in accordance with the dimension of the document M, the distance by which the discharge stacker 4 in the extended state is extended. Thus, in the scanner 1 of the present embodiment, the document M is able to be mounted on the second mounting surface 4a in an appropriate state in accordance with the dimension of the document M.

As described above, the scanner 1 of the present embodiment includes the medium detecting section 12 for detecting the presence/absence of a document M on the second mounting surface 4a, and as indicated by the flowcharts of FIGS. 14, 15, and 17, the control section 100 does not bring the discharge stacker 4 into the stored state when the medium detecting section 12 detects the presence of a document M on the second mounting surface 4a, and the control section 100 is able to bring the discharge stacker 4 into the stored state when the medium detecting section 12 detects the absence of a document M on the second mounting surface 4a. In other words, the scanner 1 of the present embodiment performs the second control when the medium detecting section 12 detects the presence of a document M on the second mounting surface 4a, and the scanner 1 performs the first control when the medium detecting section 12 detects the absence of the document M on the second mounting surface 4a. Thus, the scanner 1 of the present embodiment is able to automatically displace the discharge stacker 4 to an appropriate state.

As described above, the scanner 1 of the present embodiment includes the medium-mounting-amount detecting section 14 for detecting the number or weight of documents M discharged to the second mounting surface 4a, and as indicated by the flowcharts of FIGS. 14 to 17, the control section 100 does not bring the discharge stacker 4 into the stored state when the medium-mounting-amount detecting section 14 detects that the amount of documents M mounted on the second mounting surface 4a is not equal to or more than the upper limit value, and the control section 100 is able to bring the discharge stacker 4 into the stored state when the medium-mounting-amount detecting section 14 detects that the amount of documents M mounted on the second mounting surface 4a is equal to or more than the upper limit value. In other words, the scanner 1 of the present embodiment performs the second control when the medium-mounting-amount detecting section 14 detects that the amount of documents M mounted on the second mounting surface 4a is not equal to or more than the upper limit value, and the scanner 1 performs the first control when the medium-mounting-amount detecting section 14 detects that the amount of documents M mounted on the second mounting surface 4a is equal to or more than the upper limit value. That is, when the amount of documents M mounted on the second mounting surface 4a is equal to or more than the upper limit value, the scanner 1 of the present embodiment makes a new document M not easily mounted on the first mounting surface 3a, thus making it possible to inhibit a new document M from being transported and to inhibit, for example, the discharge stacker 4 from being damaged when the amount of documents M mounted on the second mounting surface 4a exceeds the upper limit value and is beyond endurance limit of the discharge stacker 4.

Here, when the medium-mounting-amount detecting section 14 detects that the amount of documents M mounted on the second mounting surface 4a is equal to or more than the upper limit value, the control section 100 is able to output an alert to the operation panel 201, the external computer 200, or the like. Thus, when the amount of documents M mounted on the second mounting surface 4a is equal to or more than the upper limit value, it is possible to inhibit the user from mounting a new document M on the first mounting surface 3a and to effectively suppress, for example, a damage to the discharge stacker 4.

As described above, the scanner 1 of the present embodiment includes the strengthening member 13 that is provided near the discharge port 11 serving as the discharge section through which the document M is discharged along the transport path 10 to the discharge stacker 4 and that strengthens, when the document M is discharged, the document M so as to curve a central portion of the document M to be mounted on the second mounting surface 4a such that the central portion is projected to the second mounting surface 4a as viewed in the discharge direction D of the document M. By discharging the document M to the second mounting surface 4a while strengthening the document M, it is possible to suppress a failure in discharging the document M.

Needless to say, the disclosure is not limited to the embodiment described above, various modifications can be made within the scope of the disclosure described in the claims, and these modifications are also included within the scope of the disclosure. Moreover, the medium-transporting device is applied to the scanner in the above-described embodiment but is applicable to a recording apparatus, for example, a printer, which includes a recording head for performing recording on a recording sheet, which is an example of the medium.

What is claimed is:

1. A medium-transporting device that transports a medium, the medium-transporting device comprising:
   a medium-support section that has a first mounting surface which is inclined relative to a horizontal plane and on which the medium is mounted;
   a transport path for transporting the medium mounted on the first mounting surface, the transport path having a curved path on which the medium is transported in a curved state;
   a discharge stacker that has a second mounting surface for receiving the medium discharged along the transport path and that is configured to switch between an extended state in which the second mounting surface is inclined relative to the horizontal plane so as to include a position at which the second mounting surface is inclined at an angle identical to an inclination angle of the first mounting surface and a stored state in which the second mounting surface is stored in the medium-transporting device; and
   a controller that switches the discharge stacker between the extended state and the stored state, wherein
   the controller is configured to perform
   first control of switching the discharge stacker from the extended state to the stored state after the medium discharged along the transport path is discharged to the second mounting surface and
   second control of not switching the discharge stacker from the extended state to the stored state such that the medium discharged along the transport path remains mounted on the second mounting surface,
   wherein the controller performs either the first control or the second control in accordance with a dimension of the medium in a transport direction.

2. The medium-transporting device according to claim 1, wherein
   the controller is configured to perform an addition mode in which, after the medium is discharged to the second mounting surface, a new medium is added to the first mounting surface and transported, and
   the controller performs the second control in the addition mode.

3. The medium-transporting device according to claim 2, wherein
   in the addition mode, after the medium is discharged to the second mounting surface, the controller displaces the discharge stacker such that an inclination angle of the second mounting surface relative to the horizontal plane is larger than an inclination angle of the second mounting surface before the medium is discharged.

4. The medium-transporting device according to claim 1, wherein
   when the dimension of the medium in the transport direction is equal to or more than a first threshold, the controller performs the second control.

5. The medium-transporting device according to claim 1, wherein
   when the dimension of the medium in the transport direction is equal to or less than a second threshold, the controller performs the first control.

6. The medium-transporting device according to claim 1, wherein
   a dimension of the discharge stacker in the extended state is configured to be varied, and
   the controller changes the dimension of the discharge stacker in the extended state in accordance with a dimension of the medium in a transport direction.

7. The medium-transporting device according to claim 1, further comprising
   a strengthening member that is provided in a discharge section through which the medium is discharged along the transport path to the discharge stacker and that strengthens the medium when the medium is discharged, wherein
   the strengthening member curves a central portion of the medium discharged to the second mounting surface such that the central portion is projected to the second mounting surface as viewed in a discharge direction of the medium.

8. An image reading apparatus comprising:
   the medium-transporting device according to claim 1; and
   a reading section that reads an image of the medium on the transport path.

9. A medium-transporting device that transports a medium, the medium-transporting device comprising:
   a medium-support section that has a first mounting surface which is inclined relative to a horizontal plane and on which the medium is mounted;
   a transport path for transporting the medium mounted on the first mounting surface, the transport path having a curved path on which the medium is transported in a curved state;
   a discharge stacker that has a second mounting surface for receiving the medium discharged along the transport path and that is configured to switch between an extended state in which the second mounting surface is inclined relative to the horizontal plane so as to include a position at which the second mounting surface is inclined at an angle identical to an inclination angle of the first mounting surface and a stored state in which the second mounting surface is stored in the medium-transporting device;
   a medium detector that detects the medium on the second mounting surface; and
   a controller that switches the discharge stacker between the extended state and the stored state, wherein
   the controller is configured to perform first control of switching the discharge stacker from the extended state to the stored state after the medium discharged along the transport path is discharged to the second mounting surface and second control of not switching the discharge stacker from the extended state to the stored state such that the medium discharged along the transport path remains mounted on the second mounting surface, wherein when the medium detector detects the presence of the medium on the second mounting surface, the controller performs the second control, and when the medium detecting section detects the absence of the medium on the second mounting surface, the controller performs the first control.

10. A medium-transporting device that transports a medium, the medium-transporting device comprising:
- a medium-support section that has a first mounting surface which is inclined relative to a horizontal plane and on which the medium is mounted;
- a transport path for transporting the medium mounted on the first mounting surface, the transport path having a curved path on which the medium is transported in a curved state;
- a discharge stacker that has a second mounting surface for receiving the medium discharged along the transport path and that is configured to switch between an extended state in which the second mounting surface is inclined relative to the horizontal plane so as to include a position at which the second mounting surface is inclined at an angle identical to an inclination angle of the first mounting surface and a stored state in which the second mounting surface is stored in the medium-transporting device;
- a medium-mounting-amount detector that detects the number or weight of media discharged to the second mounting surface; and
- a controller that switches the discharge stacker between the extended state and the stored state, wherein the controller is configured to perform first control of switching the discharge stacker from the extended state to the stored state after the medium discharged along the transport path is discharged to the second mounting surface and second control of not switching the discharge stacker from the extended state to the stored state such that the medium discharged along the transport path remains mounted on the second mounting surface, wherein when the medium-mounting-amount detector detects that an amount of the media mounted on the second mounting surface is not equal to or more than an upper limit value, the controller performs the second control, and when the medium-mounting-amount detector detects that the amount of the media mounted on the second mounting surface is equal to or more than the upper limit value, the controller performs the first control.

11. The medium-transporting device according to claim 10, wherein when the medium-mounting-amount detector detects that the amount of the media mounted on the second mounting surface is equal to or more than the upper limit value, the controller outputs an alert.

\* \* \* \* \*